United States Patent
Huang

(10) Patent No.: US 10,673,837 B2
(45) Date of Patent: Jun. 2, 2020

(54) DOMAIN PASS-THROUGH AUTHENTICATION IN A HYBRID CLOUD ENVIRONMENT

(71) Applicant: Citrix Systems, Inc., Fort Lauderdale, FL (US)

(72) Inventor: Feng Huang, Girton (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 186 days.

(21) Appl. No.: 15/995,540

(22) Filed: Jun. 1, 2018

(65) Prior Publication Data
US 2019/0372960 A1 Dec. 5, 2019

(51) Int. Cl.
*H04L 29/06* (2006.01)
*G06F 21/33* (2013.01)

(52) U.S. Cl.
CPC ........ *H04L 63/0815* (2013.01); *G06F 21/335* (2013.01); *H04L 63/061* (2013.01); *H04L 63/0807* (2013.01); *H04L 63/101* (2013.01); *H04L 63/102* (2013.01)

(58) Field of Classification Search
CPC ............... H04L 63/0815; H04L 63/061; H04L 63/0807; H04L 63/101; H04L 63/102; H04L 9/3228; H04L 9/3247; H04L 9/3234; H04L 9/3213; H04L 67/10; H04L 67/1097; H04L 63/08; H04L 63/0884; H04L 63/0892; H04L 67/1002; G06F 21/335; G06F 21/6218; G06F 21/31; H04W 12/06

See application file for complete search history.

(56) References Cited

U.S. PATENT DOCUMENTS

| | | | |
|---|---|---|---|
| 7,676,835 B2 * | 3/2010 | Brannon | G06F 21/6218 726/10 |
| 9,450,944 B1 | 9/2016 | Sousley et al. | |

(Continued)

OTHER PUBLICATIONS

Matthews, Andrew, "Azure AD Pass Through Authentication and Single Sign-on", cubesys, 2017, 7 pages. (Year: 2017).*

(Continued)

*Primary Examiner* — Michael Pyzocha
(74) *Attorney, Agent, or Firm* — Banner & Witcoff, Ltd.

(57) ABSTRACT

Aspects of the disclosure relate to processing systems using improved domain pass-through authentication techniques. A computing platform may send, to an external cloud computing platform, one or more registration requests that each may cause an RLS endpoint corresponding to each of a plurality of resource location connectors to be stored at the external cloud computing host platform. The computing platform may receive one or more requests for a resource location identifier. The computing platform may determine an accessible resource location connector and may send, to the user device, a corresponding resource location identifier. After receiving a pass-through authentication request, the computing platform may receive, from the ticketing service stored on the external cloud computing platform, a one-time ticket. The computing platform may send, to the user device, the one-time ticket, which may allow the user device to perform pass-through authentication with the external cloud computing platform.

20 Claims, 25 Drawing Sheets

(56) References Cited

U.S. PATENT DOCUMENTS

| | | | |
|---|---|---|---|
| 2009/0249440 A1* | 10/2009 | Platt | H04L 63/0815 726/1 |
| 2011/0307947 A1 | 12/2011 | Kariv et al. | |
| 2012/0254966 A1* | 10/2012 | Parker | G06F 9/5027 726/7 |
| 2014/0109184 A1* | 4/2014 | Parker, II | H04W 12/06 726/3 |
| 2014/0282986 A1* | 9/2014 | Leung | H04L 63/0807 726/9 |
| 2015/0237038 A1* | 8/2015 | Grajek | H04L 67/2814 726/8 |
| 2015/0319174 A1 | 11/2015 | Hayton et al. | |
| 2016/0036944 A1* | 2/2016 | Kitchen | H04L 67/12 709/203 |
| 2016/0269381 A1* | 9/2016 | Paul | H04L 63/0876 |
| 2017/0111336 A1* | 4/2017 | Davis | H04L 63/08 |
| 2017/0244730 A1* | 8/2017 | Sancheti | H04L 63/1416 |
| 2018/0337914 A1* | 11/2018 | Mohamad Abdul | H04L 9/3263 |
| 2019/0098095 A1* | 3/2019 | Innes | H04L 67/1034 |
| 2019/0311237 A1* | 10/2019 | Li | H04L 63/08 |
| 2019/0327209 A1* | 10/2019 | Seferiadis | G06F 8/61 |

OTHER PUBLICATIONS

Simons, Alex, "Introducing #AzureAD Pass-Through Authentication and Seamless Single Sign-on", Azure Active Directory Identity, First published on CloudBlogs on Dec. 7, 2016, 4 pages. (Year: 2016).*

Jul. 18, 2019 (WO) International Search Report and Written Opinion—App. PCT/US2019/033894.

Brinkhoff, Christian, "A Breakdown on Citrix Cloud Digital Workspaces in Microsoft Azure," Dec. 22, 2017, XP55604566, retrieved from https://www.mycugc.org/blogs/cugc-blogs/2017/12/22/a-breakdown-on-citrix-cloud-digital-workspaces-in, 17 pages.

Wilkerson, David, "WilkyIT—End User Computing blog: Citrix Cloud—Cloud Connector In-Depth Review," Feb. 14, 2018, XP55604554, retrieved from https://wilkyit.com/2018/02/14/citrix-cloud-cloud-connector-in-depth-review/, 20 pages.

* cited by examiner

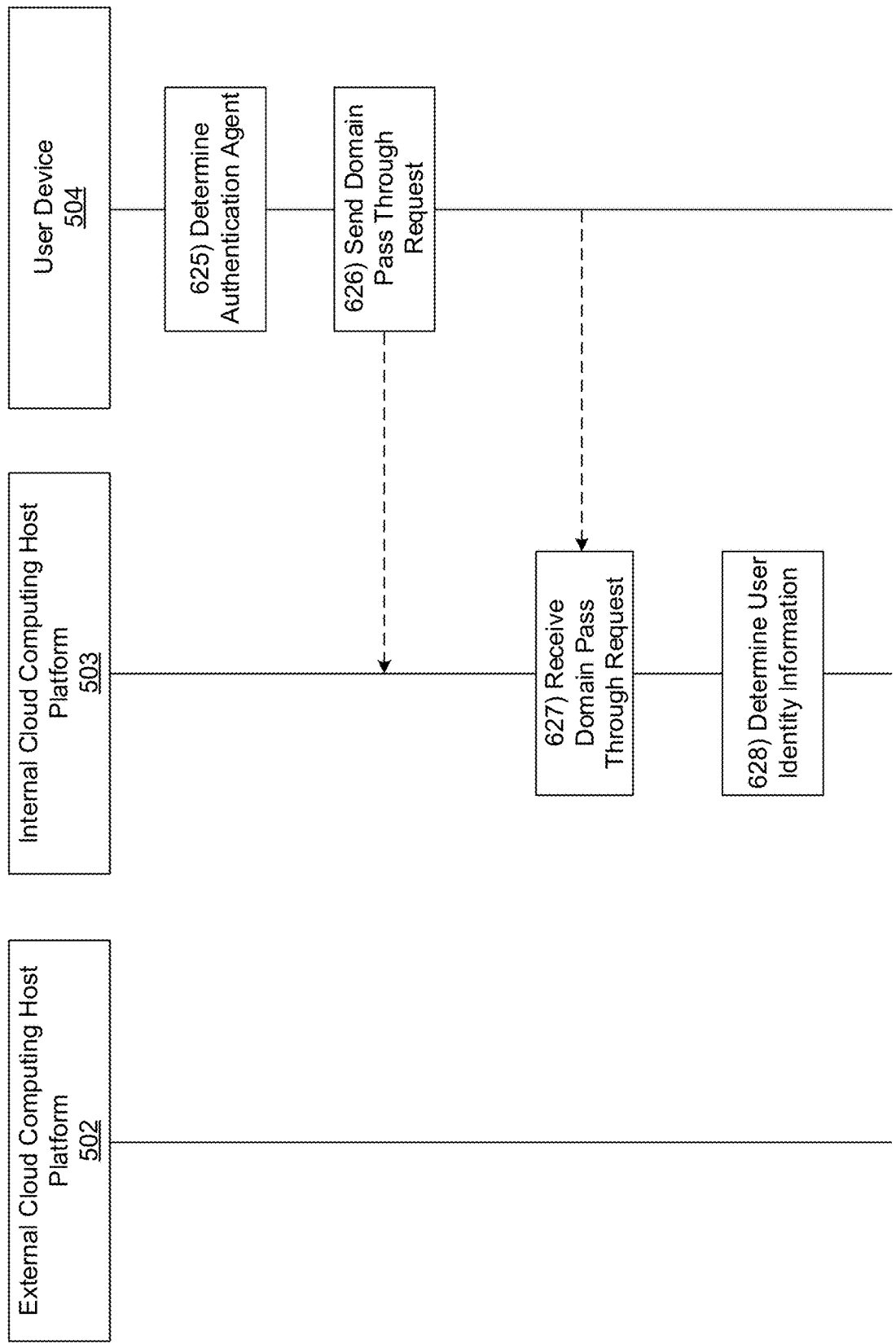

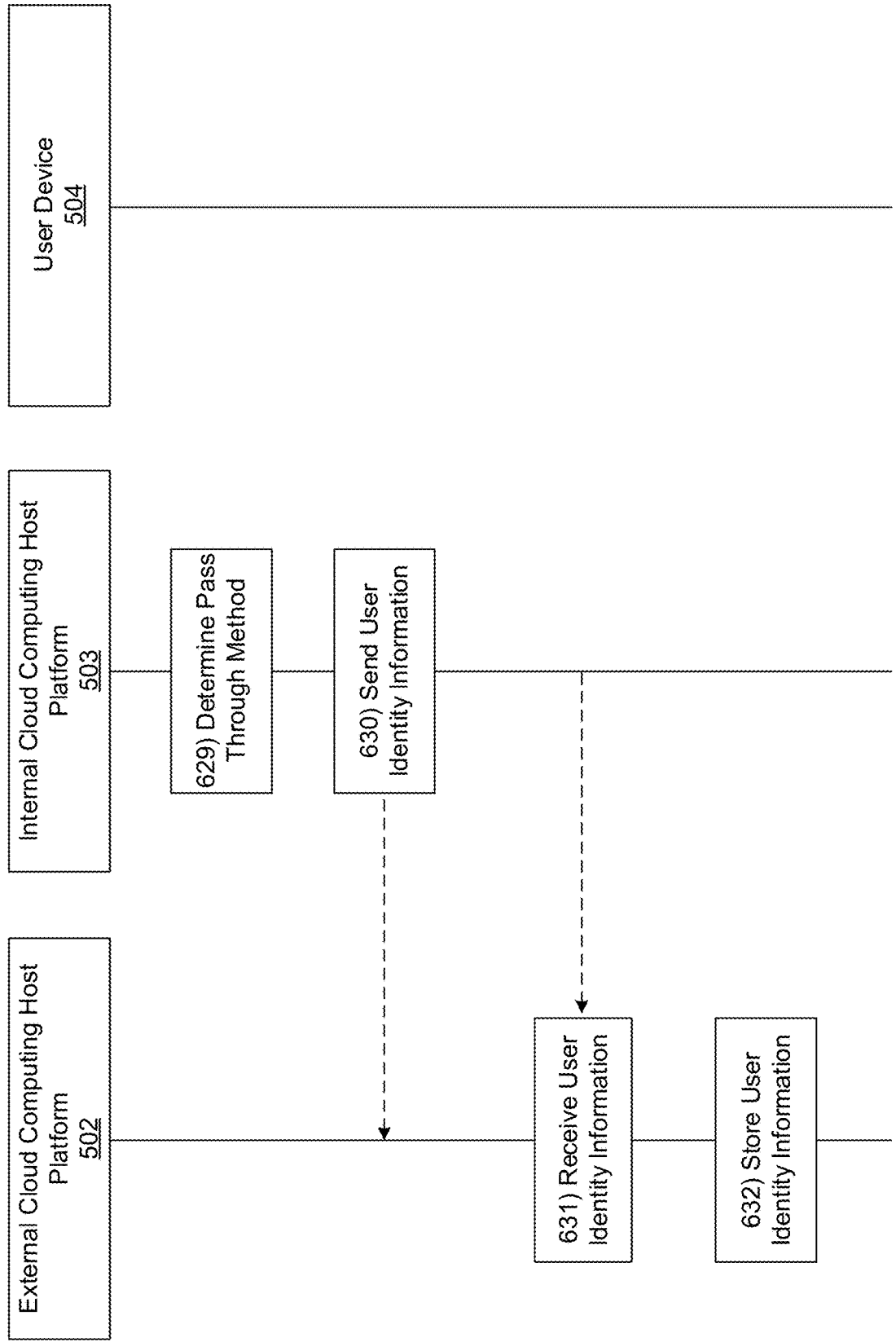

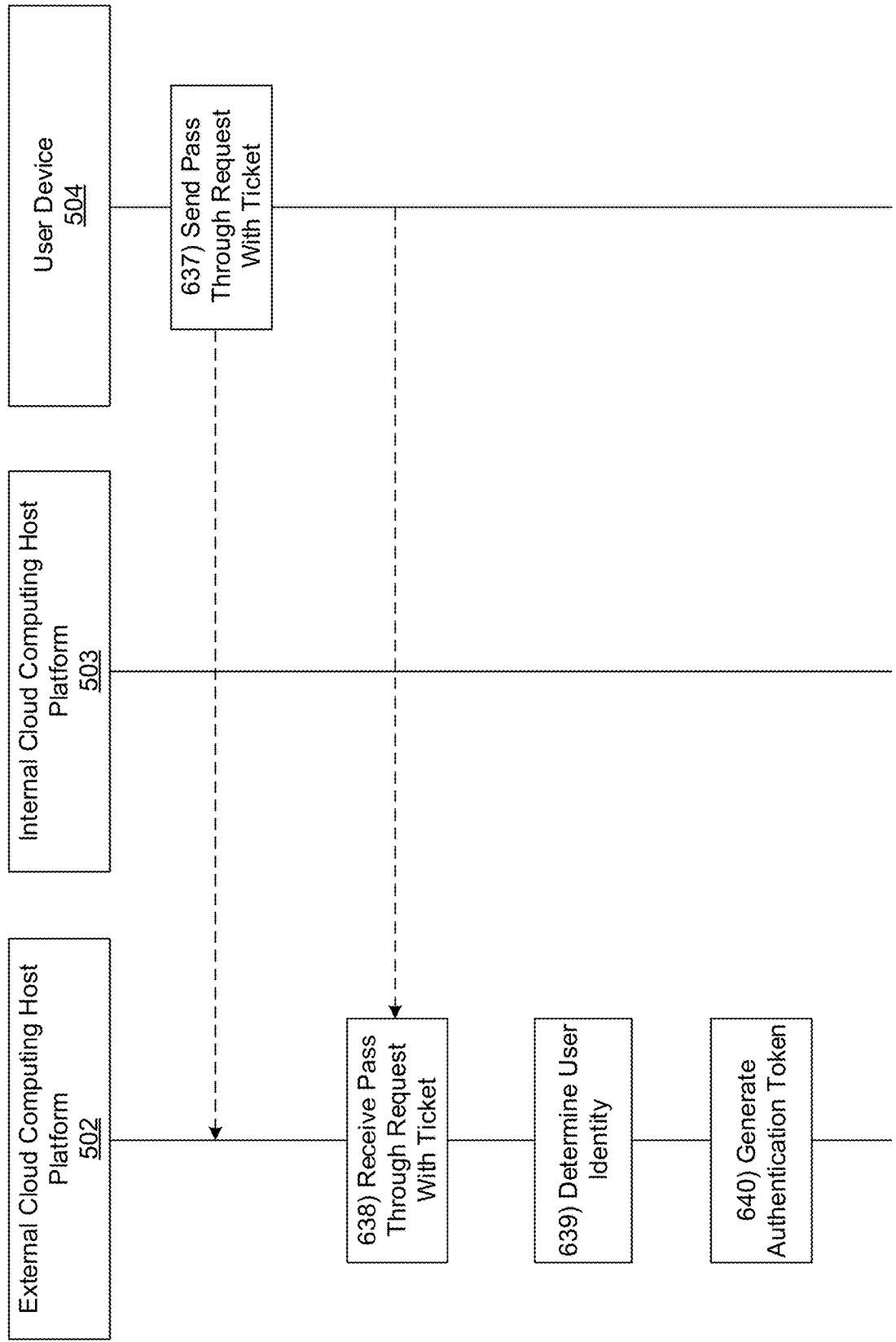

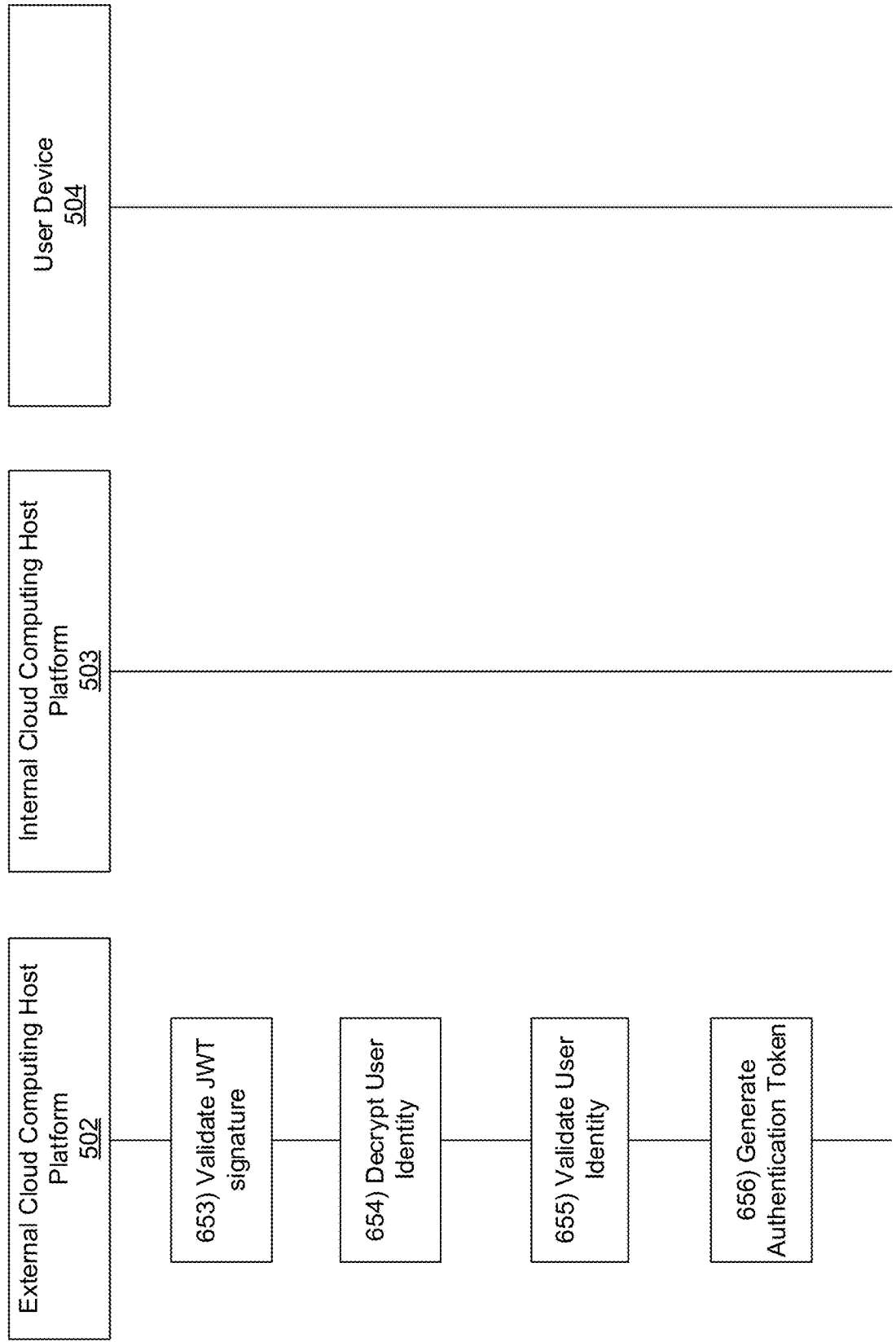

200  # DOMAIN PASS-THROUGH AUTHENTICATION IN A HYBRID CLOUD ENVIRONMENT

FIELD

Aspects described herein generally relate to enhancing processing systems for performing domain pass-through authentication in a hybrid cloud environment. In particular, one or more aspects of the disclosure relate to detecting reachable resource locations for purposes of determining whether domain pass-through authentication may be performed. One or more aspects of the disclosure also relate to various methods for performing domain pass-through authentication in a hybrid cloud environment.

BACKGROUND

Many organizations and individuals rely on enterprise application stores as a means for remotely selecting and accessing applications. It may be important to ensure an efficient login process for a user to access these enterprise application stores. In many instances, however, it may be difficult to facilitate domain pass-through authentication between enterprise application stores and user devices operating in a hybrid cloud environment.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards systems and methods for domain pass-through authentication in a hybrid cloud environment. In one or more embodiments, an internal cloud computing host platform comprising at least one processor, a communication interface, and memory may establish, with an external cloud computing platform, a first network connection. The internal cloud computing host platform may send, to the external cloud computing platform and while the first network connection is established, a registration request corresponding to each of a plurality of resource location connectors. These registration requests corresponding to each of the plurality of resource location connectors may cause a resource location service (RLS) endpoint corresponding to each of the plurality of resource location connectors to be stored at a cloud configuration service at the external cloud computing host platform. The internal cloud computing host platform may establish, with a user device, a second network connection. The internal cloud computing host platform may receive, for each of the plurality of resource location connectors, a request for a resource location identifier corresponding to each of the plurality of resource location connectors. The internal cloud computing host platform may determine an accessible resource location connector, where the accessible resource location connector comprises one of the plurality of resource location connectors that is accessible. The internal cloud computing host platform may send, to the user device and while the second network connection is established, a resource location identifier corresponding to the accessible resource location connector. The internal cloud computing host platform may receive, from the user device, a domain pass-through authentication request. In some examples, the user device may determine whether domain pass-through authentication is possible based on whether it can communicate with any resource location connectors. The internal cloud computing host platform may determine, using an authentication agent corresponding to the accessible resource location connector, a user identity. The internal cloud computing host platform may send, to a ticketing service stored on the external cloud computing platform, the user identity. The internal cloud computing host platform may receive, from the ticketing service stored on the external cloud computing platform, a one-time domain pass-through authentication ticket. The internal cloud computing host platform may send, to the user device, the one-time domain pass-through authentication ticket, wherein sending the one-time domain pass-through authentication ticket to the user device allows the user device to perform domain pass-through authentication with the external cloud computing platform and to access protected resources on the external cloud computing platform.

In some embodiments, the internal cloud computing host platform may perform, between the authentication agent and an authentication service stored at the external cloud computing host platform, a public-private key exchange. The internal cloud computing host platform may encrypt, using a public key from the authentication service, the user identity. The internal cloud computing host platform may generate a secure token including the encrypted user identity, wherein generating the secure token comprises signing the secure token with a private key corresponding to the authentication agent. The internal cloud computing host platform may send, to the user device and while the second network connection is established, the secure token, wherein sending the secure token to the user device allows the user device to perform domain pass-through authentication with the external cloud computing platform and to access protected resources on the external cloud computing platform.

In some embodiments, the internal cloud computing host platform may determine, after sending the one-time domain pass-through authentication ticket, that the domain pass-through authentication between the user device and the external cloud computing host platform was unsuccessful.

In some embodiments, the internal cloud computing host platform may perform the public-private key exchange in response to determining that the domain pass-through authentication between the user device and the external cloud computing host platform was unsuccessful.

In some embodiments, the internal cloud computing host platform may comprise an internal cloud computing host platform that includes an active directory and one or more cloud connectors, the one or more cloud connectors may each include a resource location service and an authentication agent, and the authentication agent may be connected to the active directory.

In some embodiments the internal cloud computing host platform may determine a second accessible resource location connector, where the second accessible resource location connector comprises one of the plurality of resource location connectors that is accessible. The internal cloud computing host platform may send, to the user device and while the second network connection is established, a second resource location identifier corresponding to the second accessible resource location connector. The internal cloud computing host platform may determine that a latency level corresponding to the second accessible resource location connector is higher than a latency level corresponding to the accessible resource location connector.

In some embodiments, the internal cloud computing host platform may receive the domain pass-through authentication request by receiving, based on the determination that the latency level corresponding to the second accessible resource location connector is higher than the latency level corresponding to the accessible resource location connector, the domain pass-through authentication request by the authentication agent corresponding to the accessible resource location connector.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards systems and methods for performing domain pass-through authentication in a hybrid cloud environment. A user device may determine accessible resource locations to determine whether domain pass-through authentication may be used, and if so, may use the accessible resource locations to select an appropriate authentication agent. Subsequently, a ticketing service hosted at an external cloud computing host platform may issue a one-time ticket that may be used to facilitate pass-through authentication between the user device and an enterprise application store hosted by the external cloud computing host platform. Alternatively or additionally, an authentication agent hosted at an internal cloud computing host platform may issue an encrypted token that may be used to facilitate pass-through authentication between the user device and the enterprise application store hosted by the external cloud computing host platform. In these ways, the external cloud computing host platform may verify the identity of the user device, and may determine that the user device can be trusted and is not attempting to circumvent security mechanisms of the external cloud computing host platform. As a result, individuals may efficiently access remote resources, hosted in the hybrid cloud environment, at a personal device.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
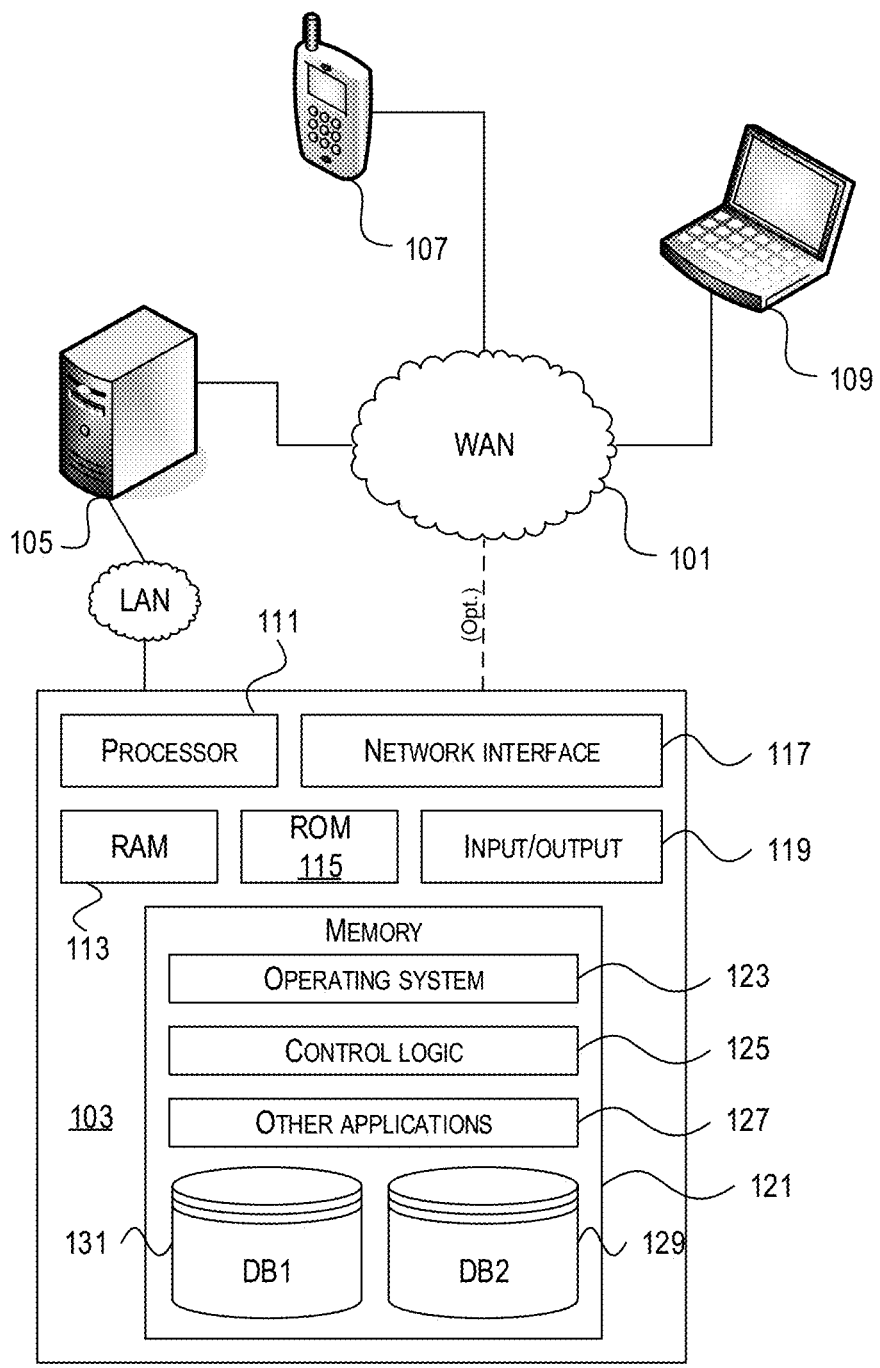
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
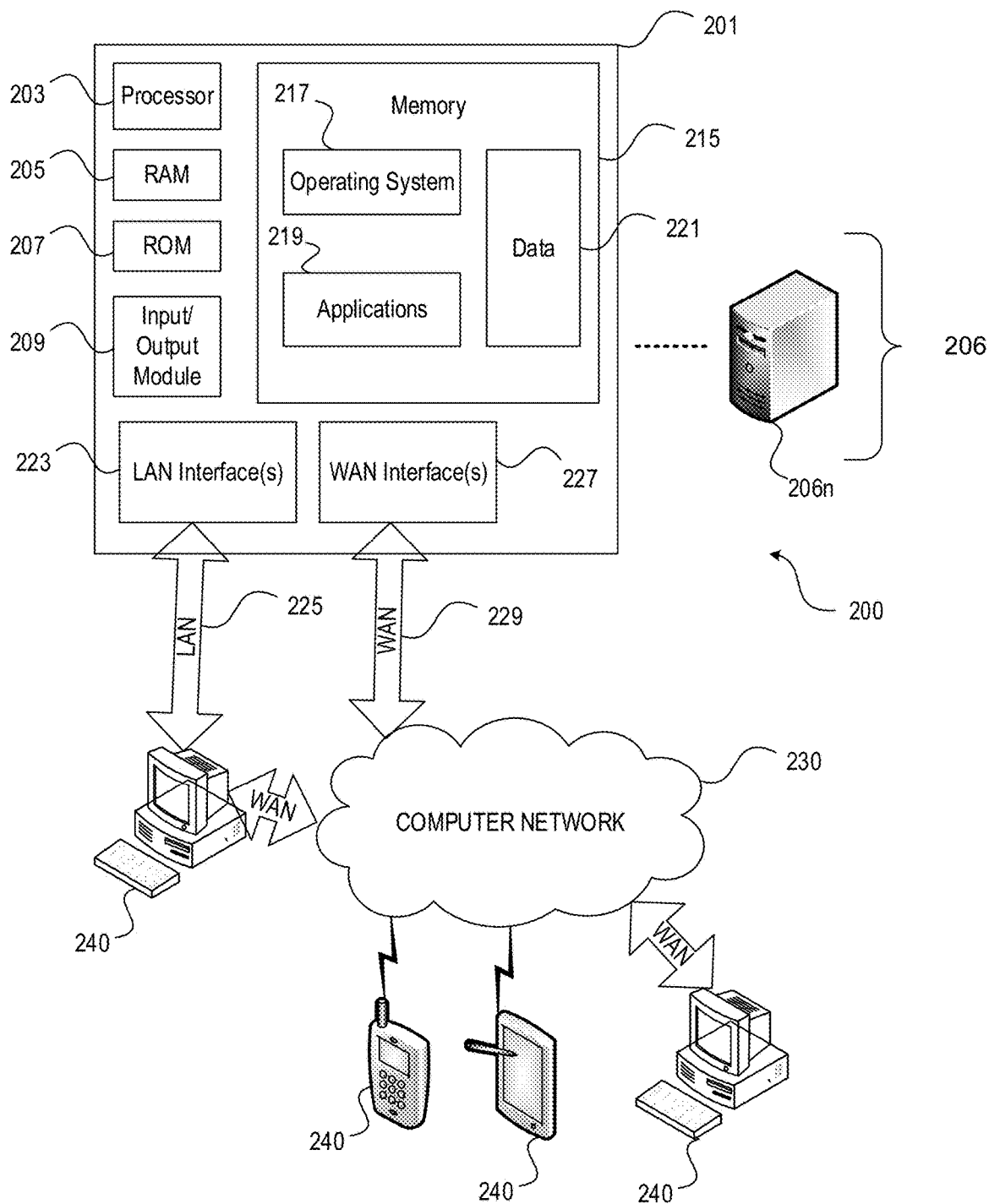
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) configured to provide virtual machines for client access devices. The computing device 201 may have a processor 203 for controlling overall operation of the server and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Transport Layer Security (TLS) VPN server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
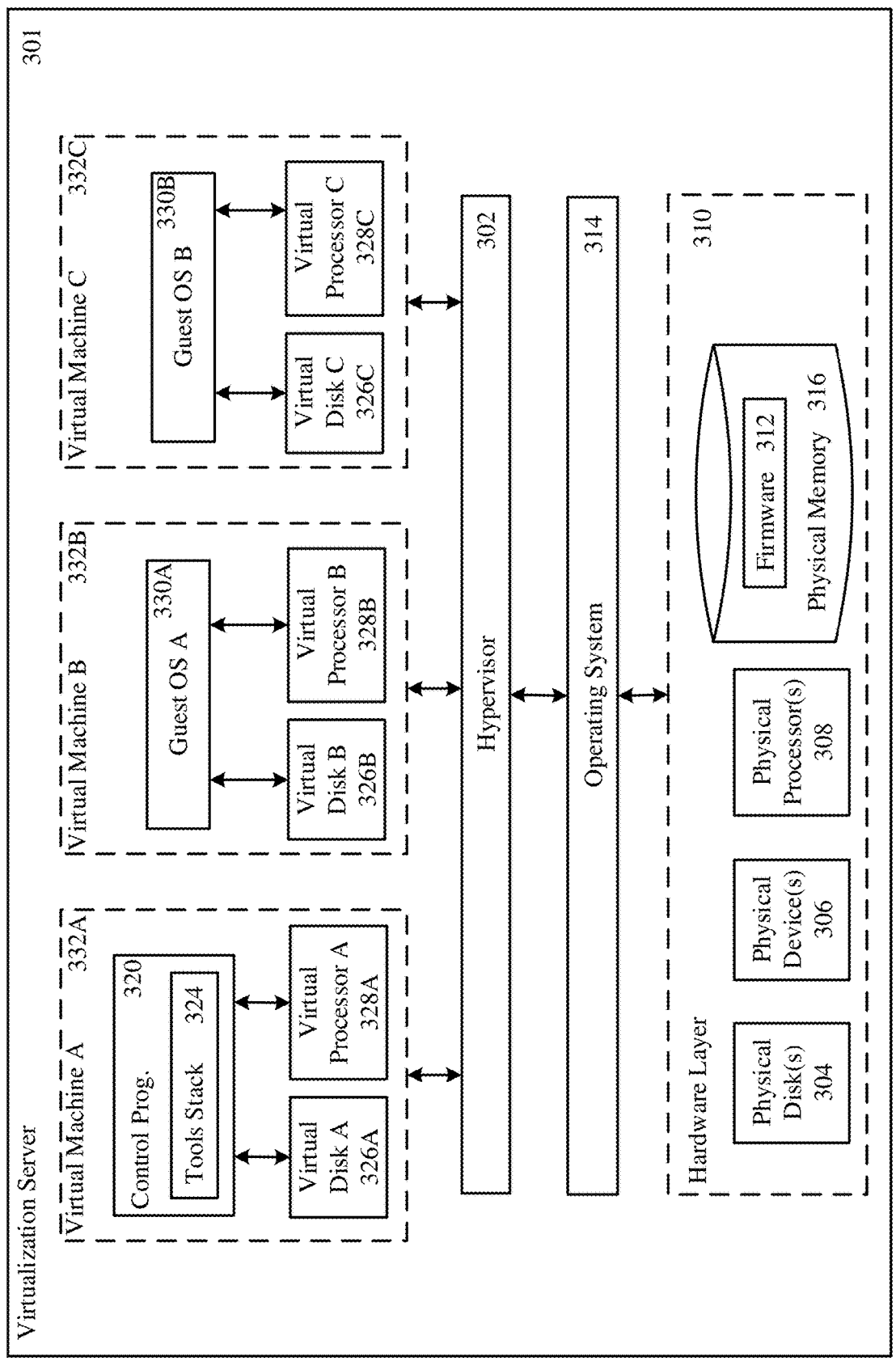
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
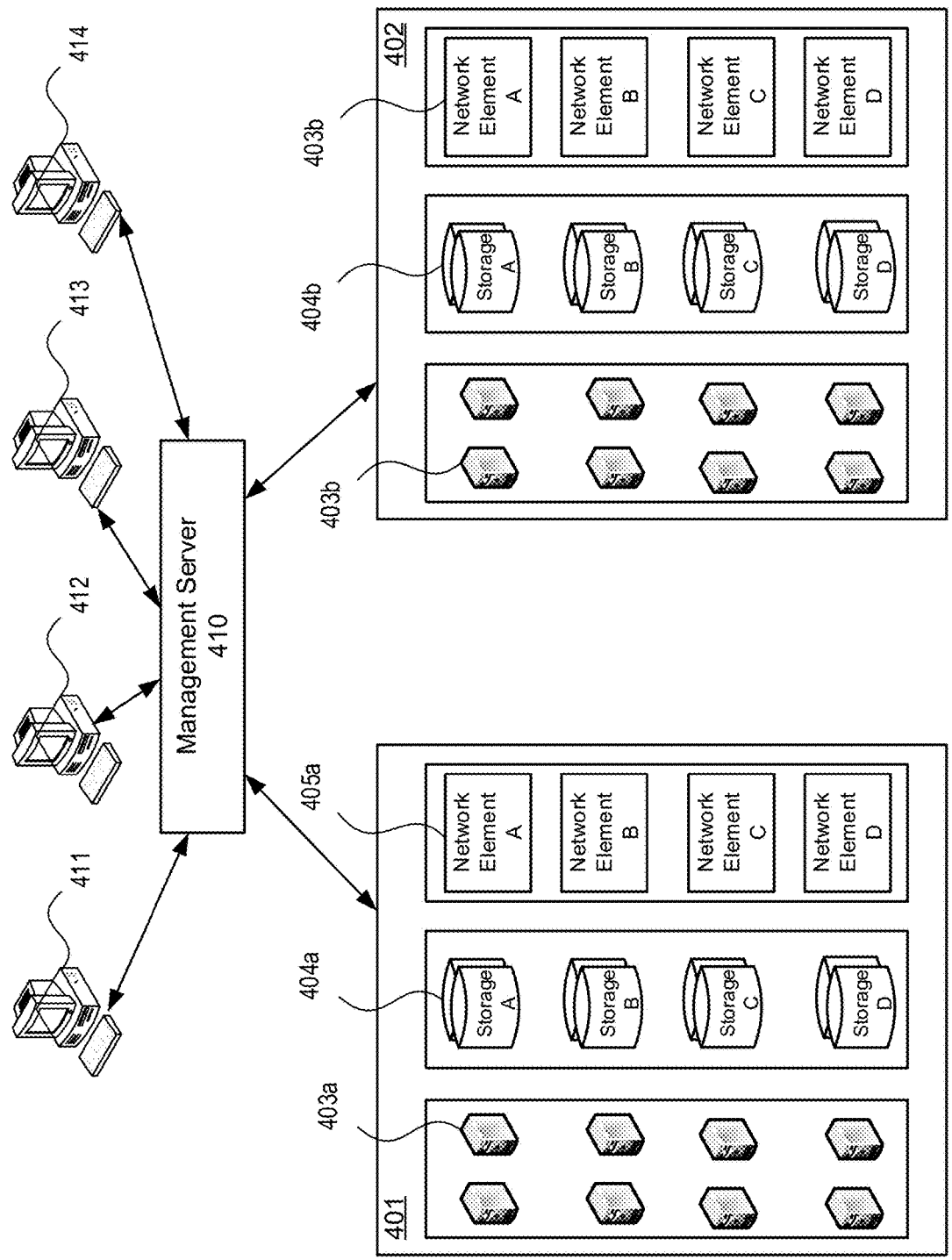
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network resources 405a-405b (generally referred herein as "network resources 405")) of the cloud system.

Management server 410 may be implemented on one or more physical servers. The management server 410 may run, for example, CLOUDPLATFORM by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Figure 5A:
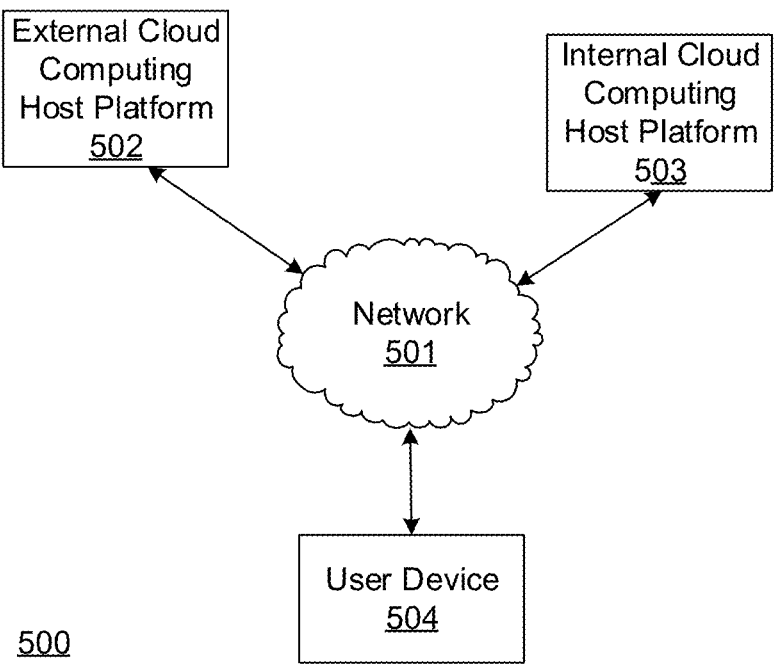
FIGS. 5A-5C depict an illustrative computing environment for deploying an external cloud computing host platform and an internal cloud computing host platform that utilize improved pass-through authentication techniques in accordance with one or more illustrative aspects described herein.
Figure 5B:
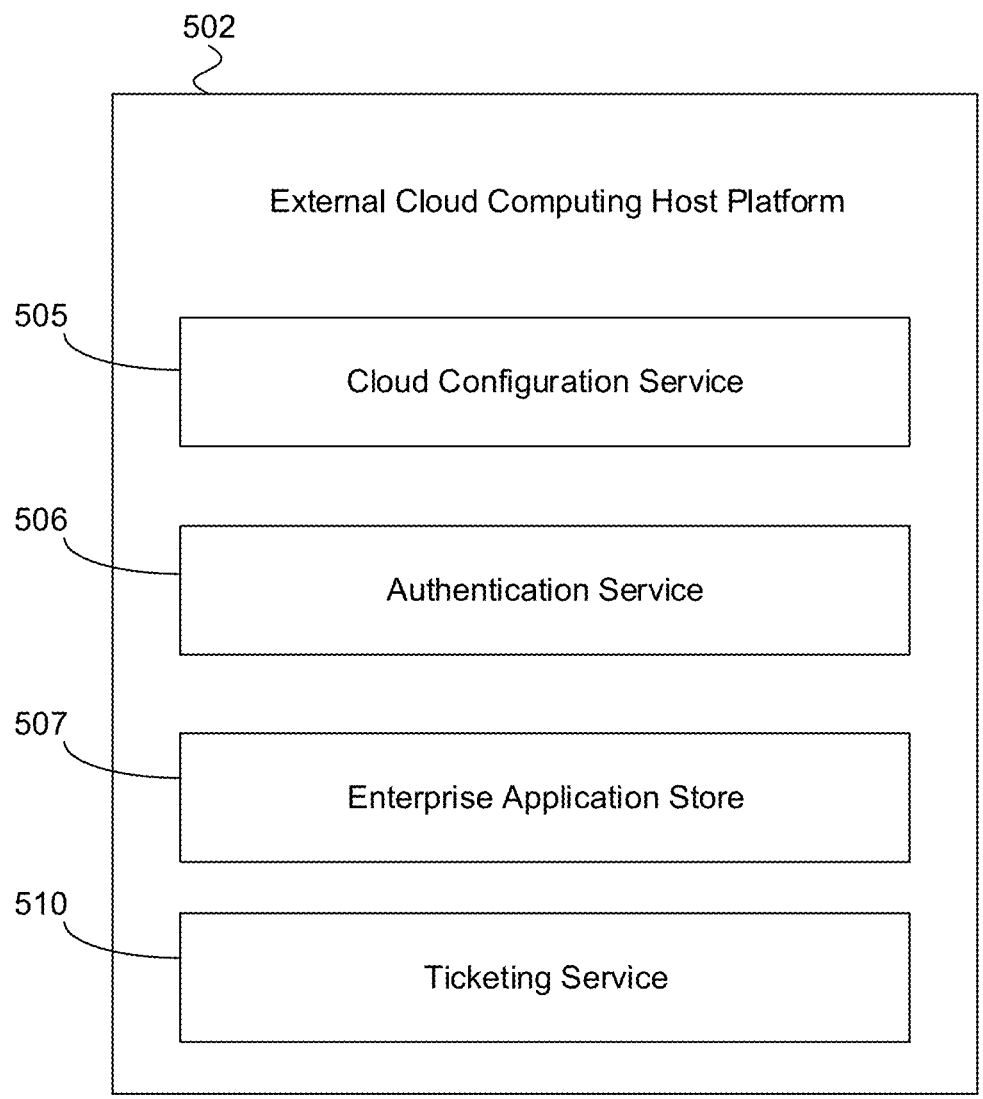
Figure 5C:
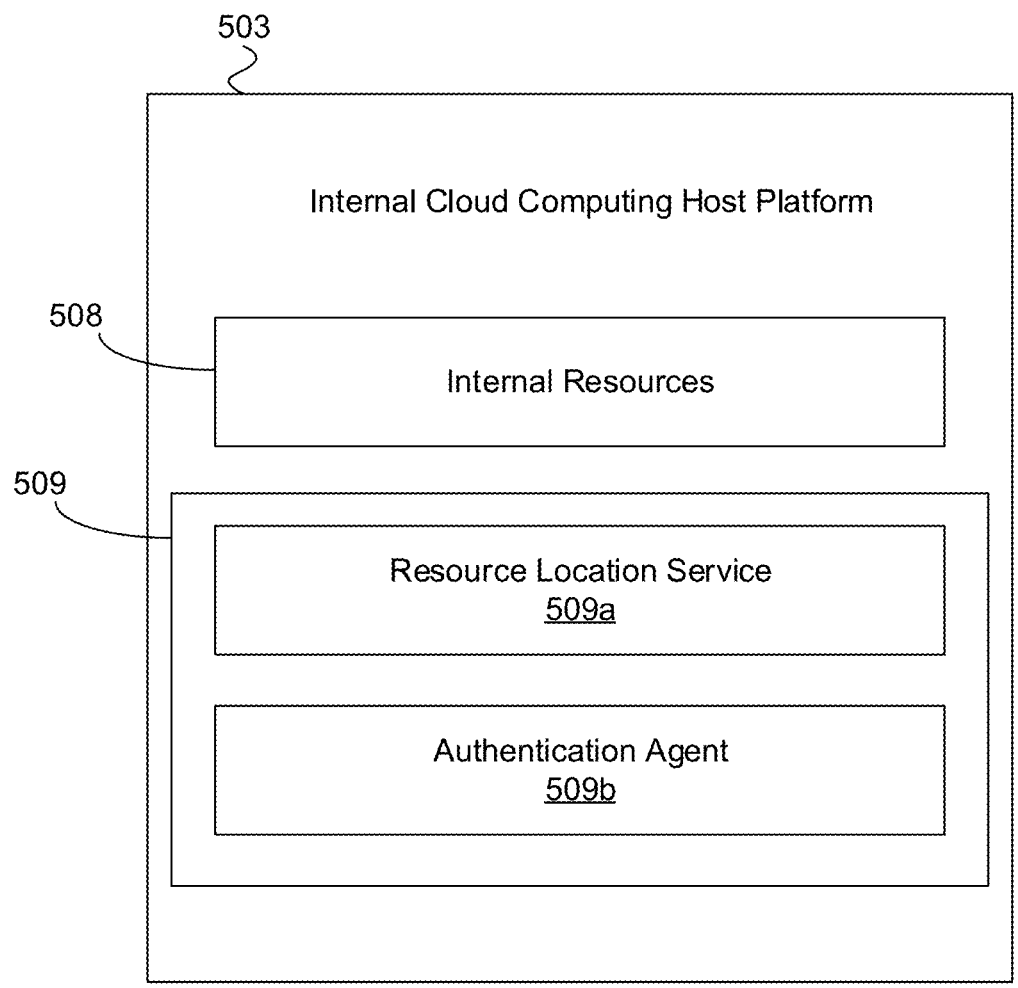

Systems and Methods for Domain Pass-Through Authentication in a Hybrid Cloud Environment FIGS. 5A-5C depict an illustrative computing environment for deploying a system for performing domain pass-through authentication in a hybrid cloud environment that utilizes improved pass-through authentication techniques in accordance with one or more example embodiments. Referring to FIG. 5A, computing environment 500 may include one or more computer systems. For example, computing environment 500 may include an external cloud computing host platform 502, and internal cloud computing host platform 503, and a user device 504. The network 501 may interconnect one or more of external cloud computing host platform 502, internal cloud computing host platform 503, and user device 504.

As illustrated in greater detail below, external cloud computing host platform 502 may include one or more computing devices configured to perform one or more of the functions described herein. For example, external cloud computing host platform 502 may include one or more computers (e.g., laptop computers, desktop computers, servers, server blades, or the like). In some examples, external cloud computing host platform 502 may implement one or more of a cloud configuration service, an authentication service, a ticketing service, and an enterprise application store. External cloud computing host platform 502 may correspond to a public cloud.

As illustrated in greater detail below, internal cloud computing host platform 503 may include one or more computing devices configured to perform one or more of the functions described herein. For example, internal cloud computing host platform 503 may include one or more computers (e.g., laptop computers, desktop computers, servers, server blades, or the like). In some examples, internal cloud computing host platform 503 may include one or more cloud connectors and one or more internal resources. In some examples, the one or more cloud connectors may each include a resource location service (RLS) and an authentication agent. In these examples, each authentication agent may be connected to an active directory corresponding to the internal cloud computing host platform 503. Internal cloud computing host platform 503 may correspond to a customer premises.

User device 504 may include one or more computing devices and/or other computer components (e.g., processors, memories, communication interfaces). In addition, and as illustrated in greater detail below, user device 504 may be configured to generate, host, transmit, and/or otherwise provide one or more web pages and/or other graphical user interfaces (which may, e.g., cause one or more other computer systems to display and/or otherwise present the one or more web pages and/or other graphical user interfaces). In some instances, the web pages and/or other graphical user interfaces generated by user device 504 may correspond to an enterprise application store used to select and access applications.

Computing environment 500 also may include one or more networks, which may interconnect external cloud computing host platform 502, internal cloud computing host platform 503, and user device 504. For example, computing environment 500 may include a network 501 (which may interconnect, e.g., external cloud computing host platform 502, internal cloud computing host platform 503, and user device 504).

In one or more arrangements, external cloud computing host platform 502, internal cloud computing host platform 503, user device 504 and/or the other systems included in computing environment 500 may be any type of computing device capable of receiving a user interface, receiving input via the user interface, and communicating the received input to one or more other computing devices. For example, external cloud computing host platform 502, internal cloud computing host platform 503, user device 504, and/or the other systems included in computing environment 500 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of external cloud computing host platform 502, internal cloud computing host platform 503, and user device 504 may, in some instances, be special-purpose computing devices configured to perform specific functions.

Referring to FIG. 5B, external cloud computing host platform 502 may include cloud configuration service 505, authentication service 506, an enterprise application store 507, and a ticketing service 510. Cloud configuration service 505 may receive and subsequently store one or more RLS endpoints. Authentication service 506 may provide one or more authentication methods and authentication agents to the user device and may facilitate pass-through authentication between the external cloud computing host platform 502 and the user device 504. Enterprise application store 507 may facilitate access between the user device 504 and various applications. Ticketing service 510 may communicate with the internal cloud computing host platform 503 to issue one-time tickets that may facilitate pass-through authentication between the external cloud computing host platform 502 and the user device 504. In some examples, cloud configuration service 505, authentication service 506, enterprise application store 507, and ticketing service 510 may be implemented by a single computing device corresponding to the external cloud computing host platform 502. In other examples, cloud configuration service 505, authentication service 506, enterprise application store 507, and ticketing service may be implemented by multiple different computing devices corresponding to the external cloud computing host platform 502.

Referring to FIG. 5C, internal cloud computing host platform 503 may include one or more internal resources 6508 such as databases, modules, servers, and the like. Internal cloud computing host platform 503 may also include one or more cloud connectors 509. The cloud connector 509. Each cloud connector 509 may host a resource location service 509a that may be used to provide resource location identifies upon request. In some examples, multiple resource location services may be interconnected or disconnected. In addition, each cloud connector 509 may implement an authentication agent 509b to implement pass-through authentication and to securely transport a user principle and identity claims to the external cloud computing host platform 502 and the internal cloud computing host platform 503. In some examples, the internal cloud computing host platform 503 may communicate with the external cloud computing host platform 502 using the cloud connector 509. In addition, the external cloud computing host platform 503 may access the cloud connector 509, and other external cloud computing host platforms may be unable to access the cloud connector 509. In some examples, the user device 504 may be able to connect to the internal cloud computing host platform 503. In other examples, the user device 504 may be unable to connect to the internal cloud computing host platform 503. In these examples, the user device 504 may be unable to perform domain pass-through authentication.

Figure 6:
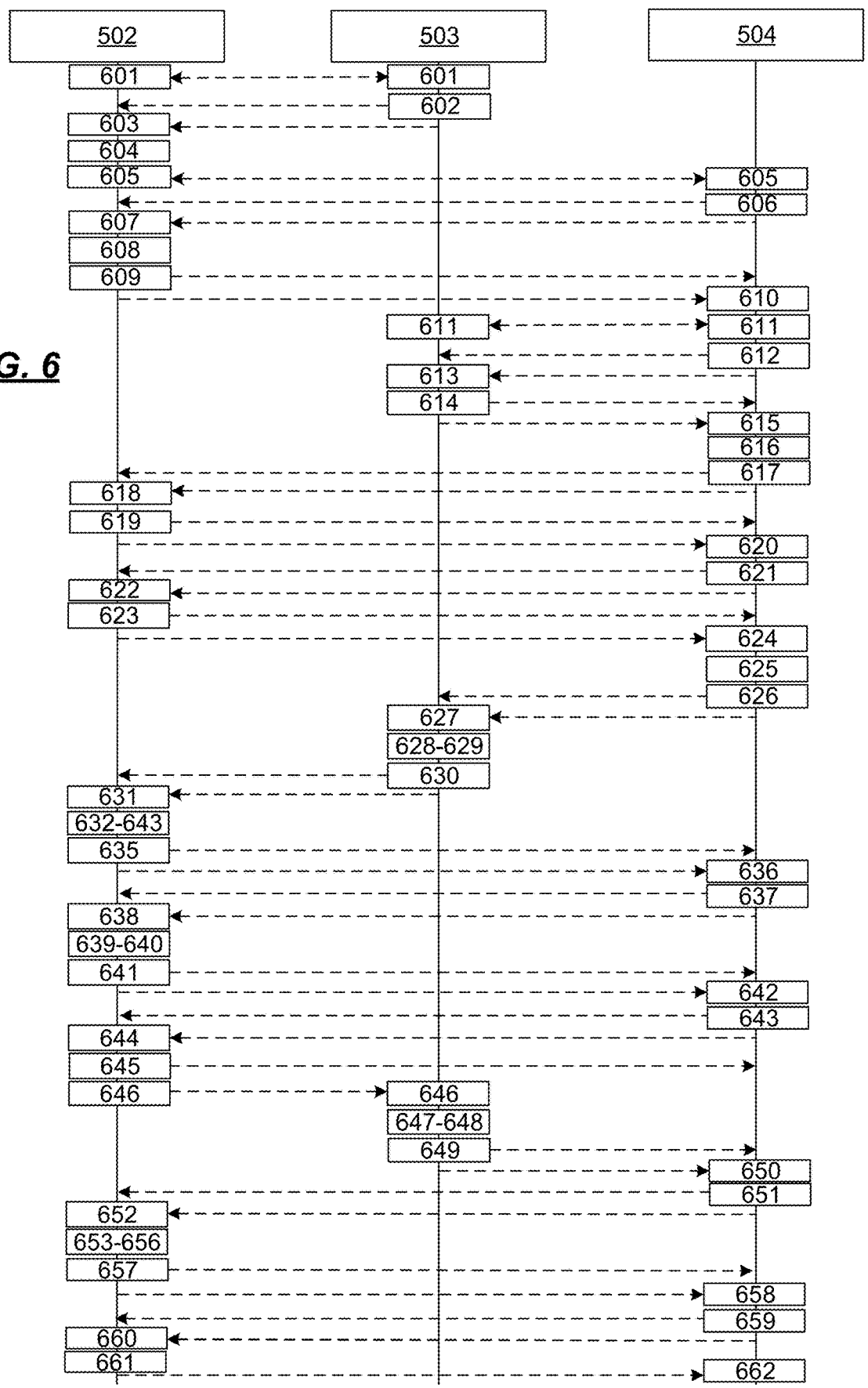
FIG. 6 depicts an illustrative event sequence for deploying an external cloud computing host platform and an internal cloud computing host platform that utilize improved pass-through authentication techniques in accordance with one or more illustrative aspects described herein.

FIG. 6 depicts an illustrative event sequence for deploying a system for domain pass-through authentication in a hybrid cloud environment that utilizes improved domain pass-through techniques in accordance with one or more example embodiments. FIG. 6 depicts an overall event sequence, and steps 601-662 are further described below with regard to FIGS. 6A-6P.

Figure 6A:
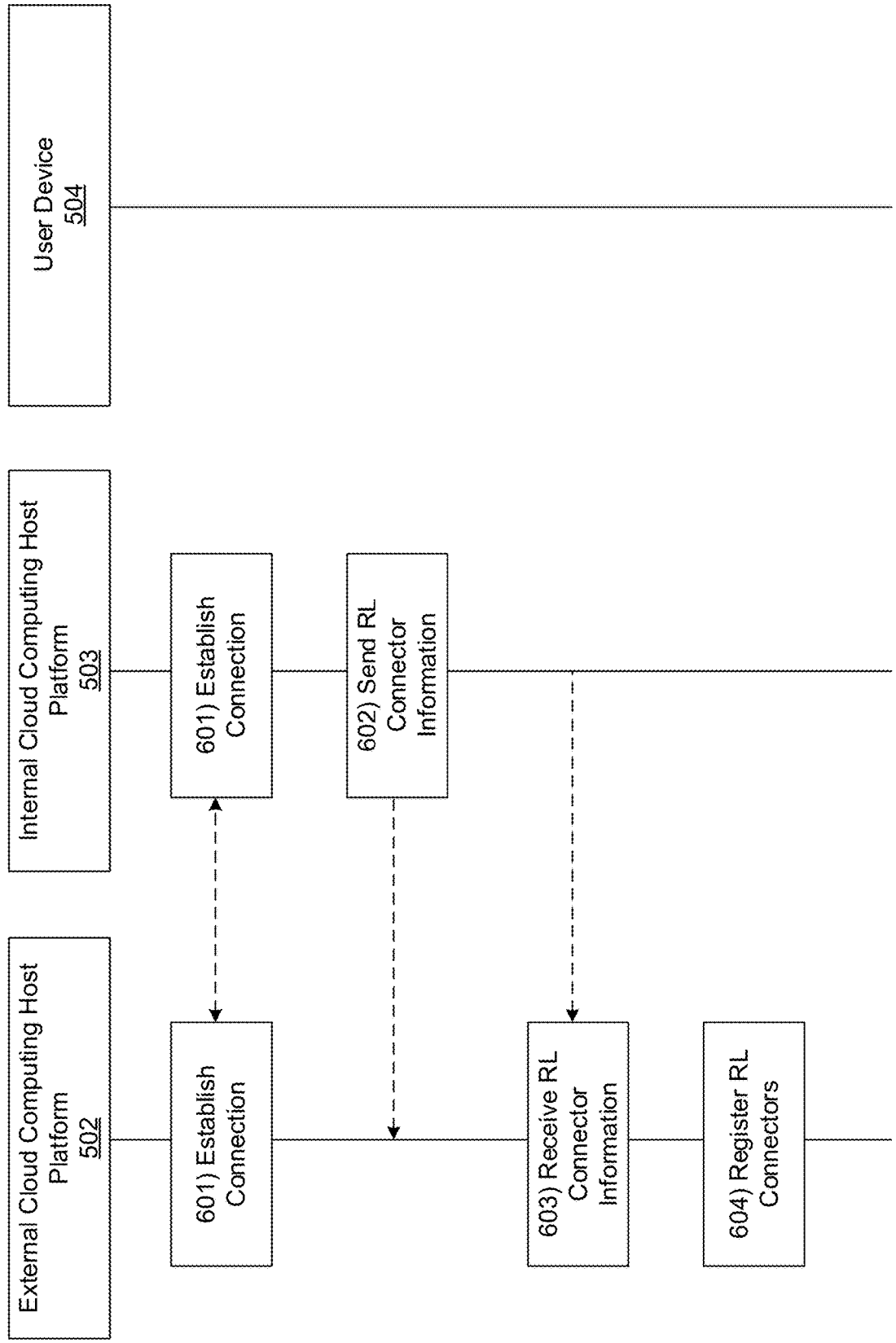
FIGS. 6A-6P depict subsets of the illustrative event sequence, shown in FIG. 6, in accordance with one or more illustrative aspects described herein.
Figure 6B:
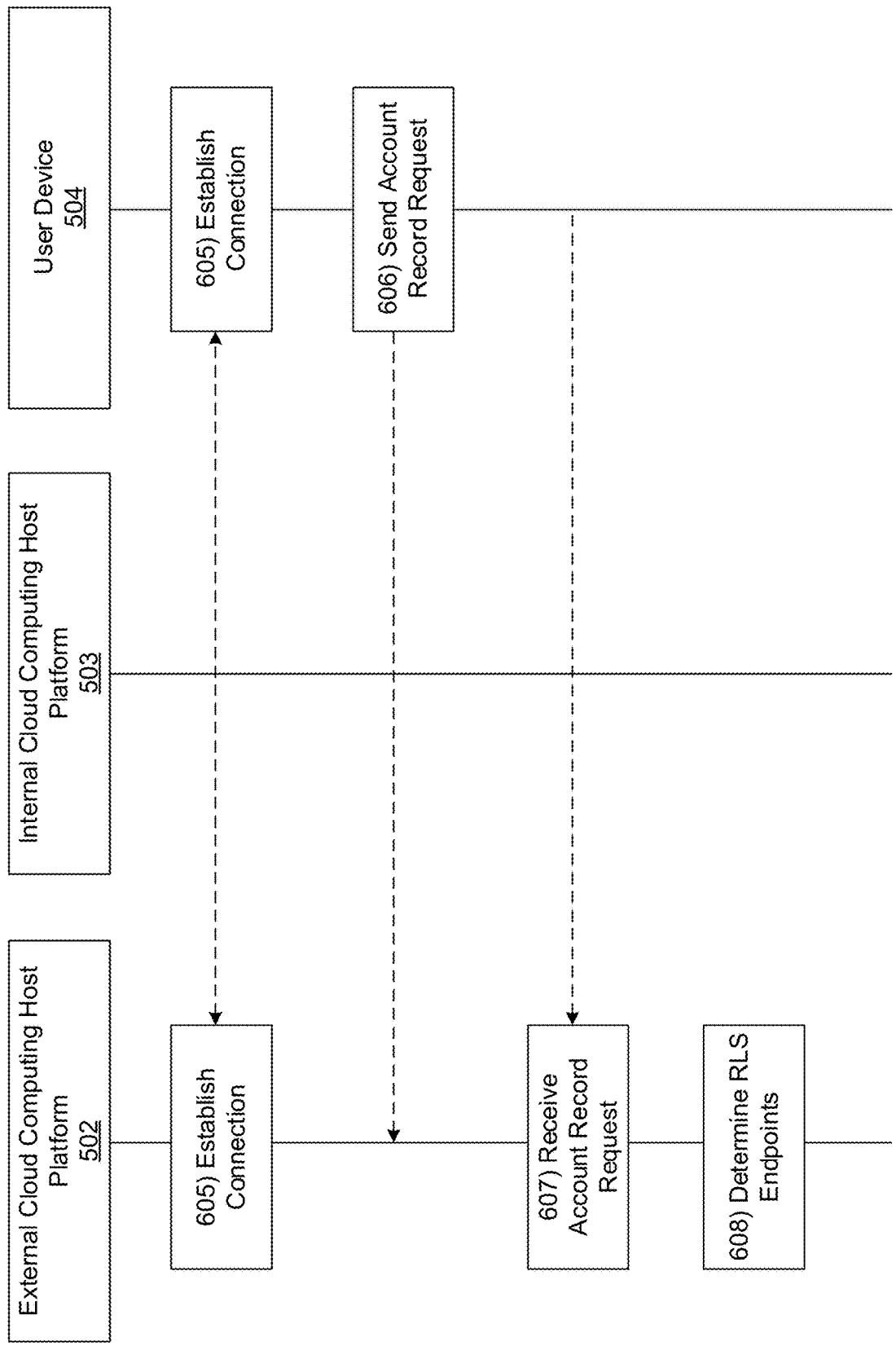
Figure 6C:
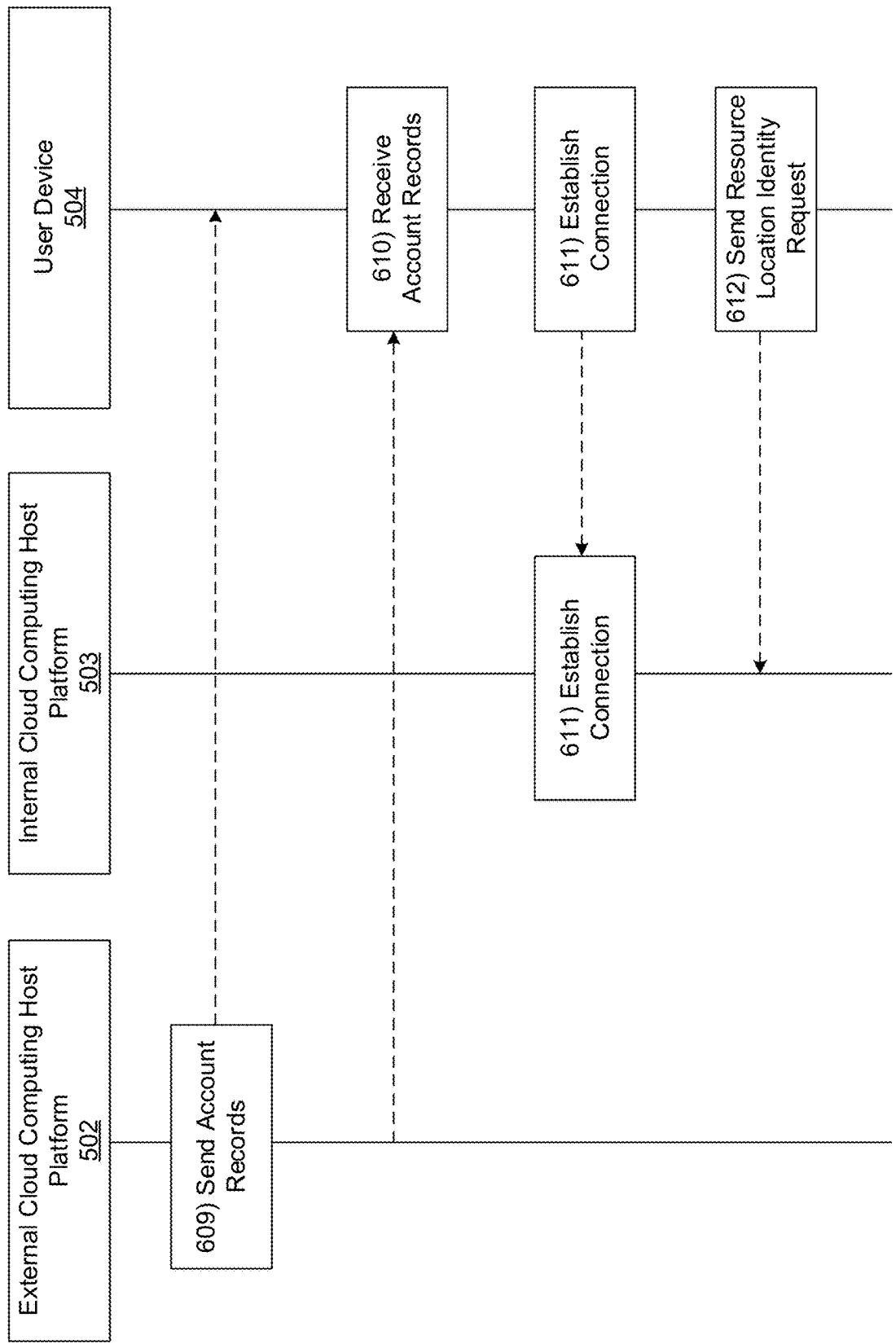
Figure 6D:
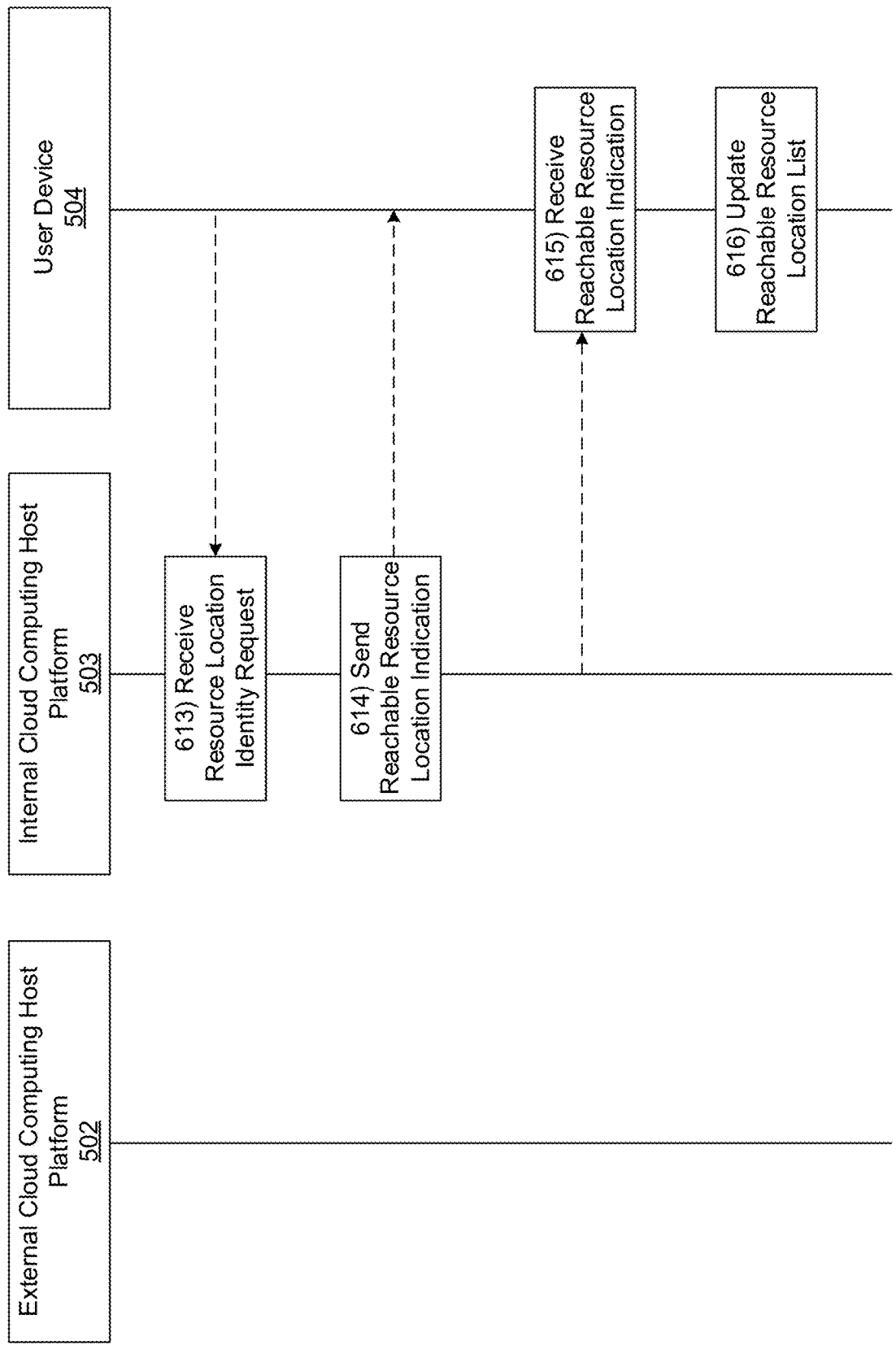
Figure 6E:
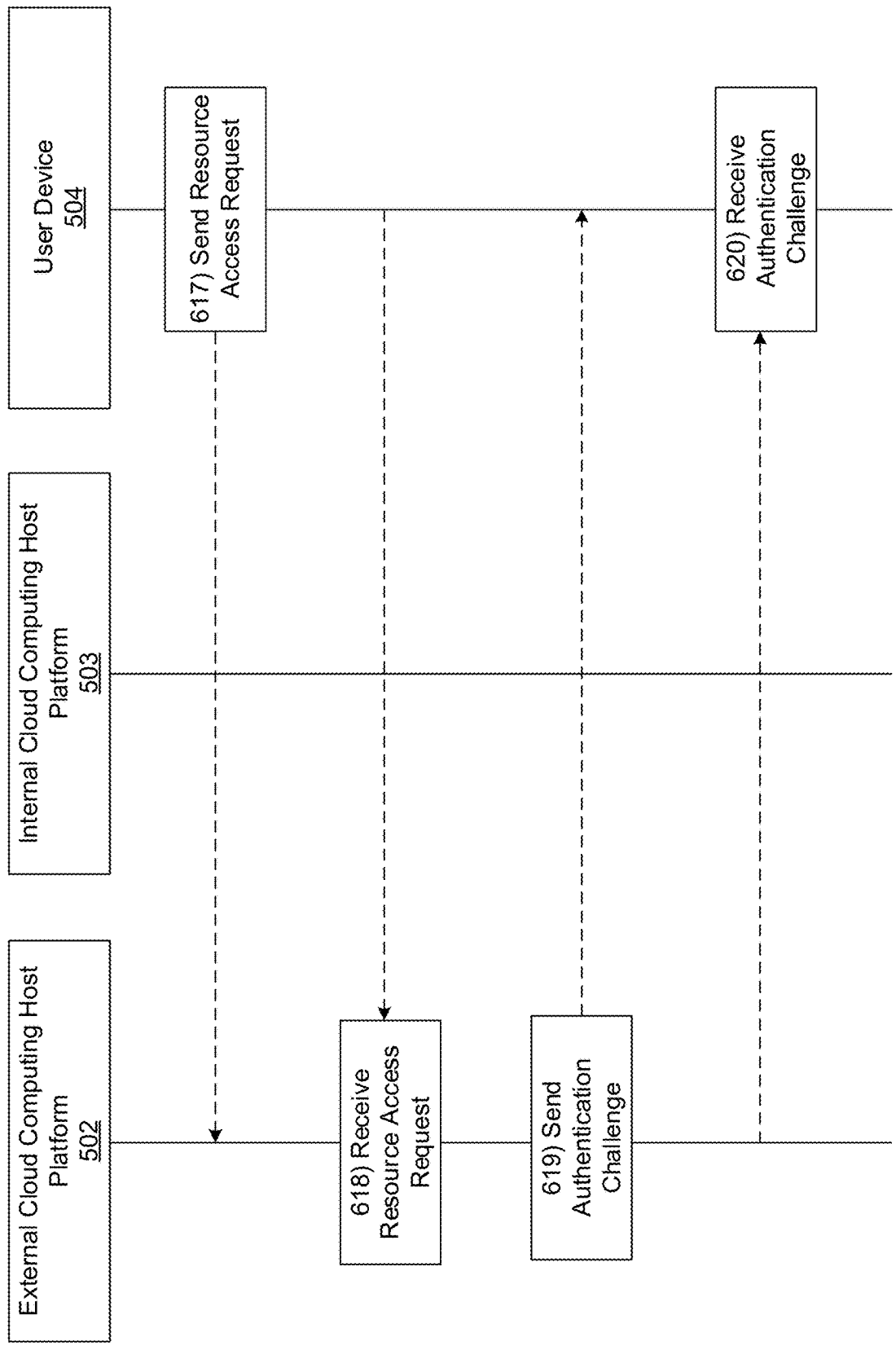
Figure 6F:
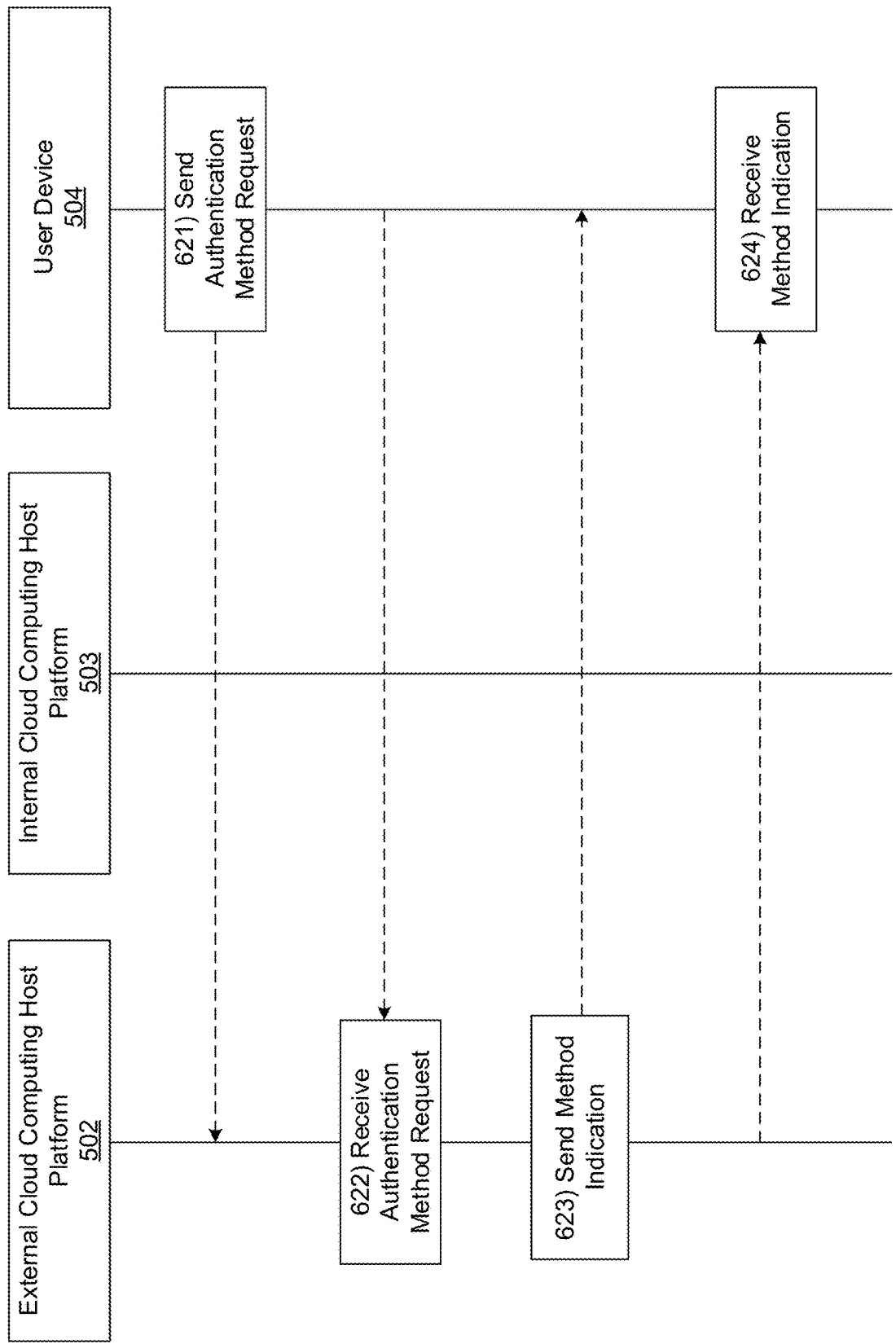
Figure 6I:
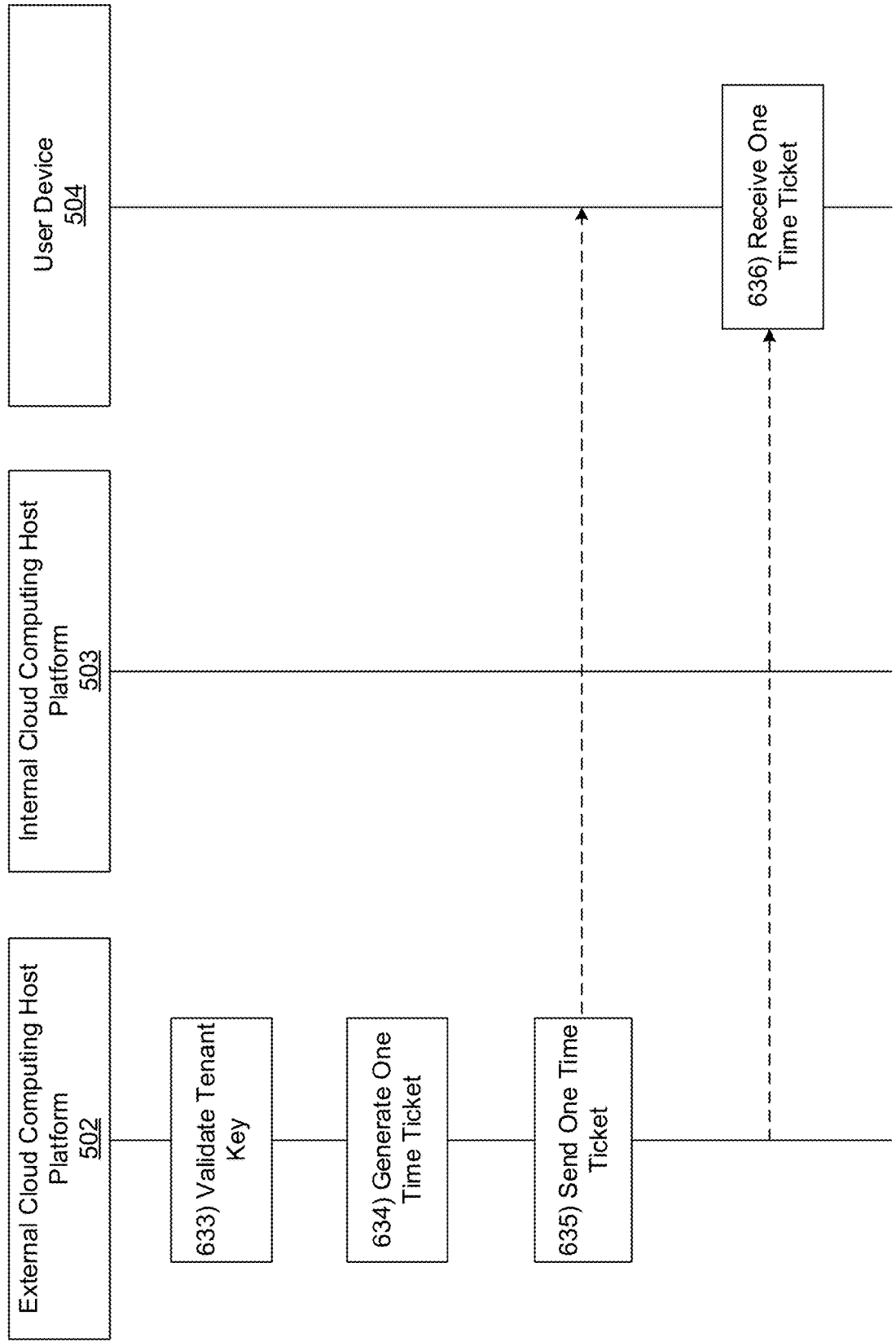
Figure 6K:
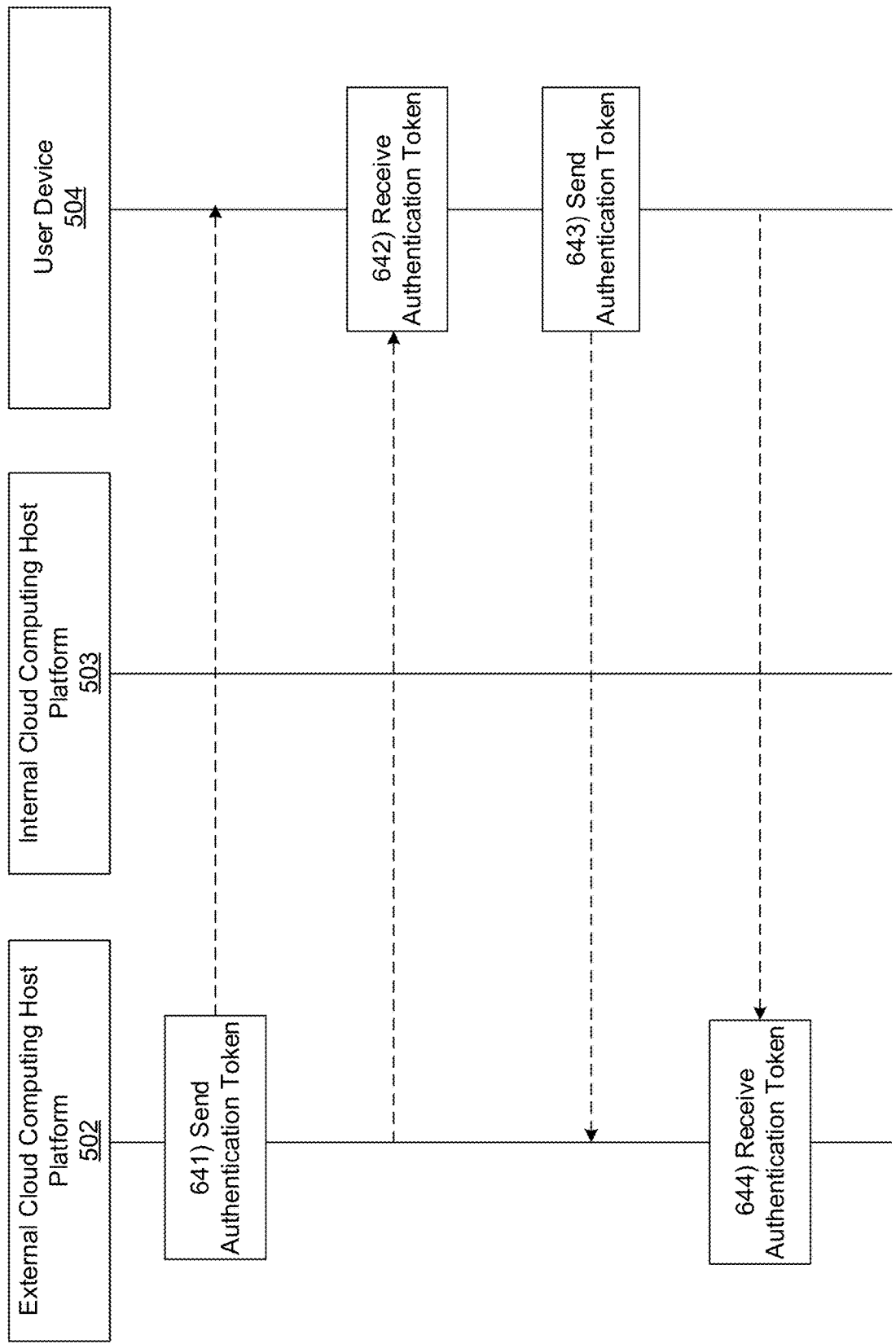
Figure 6L:
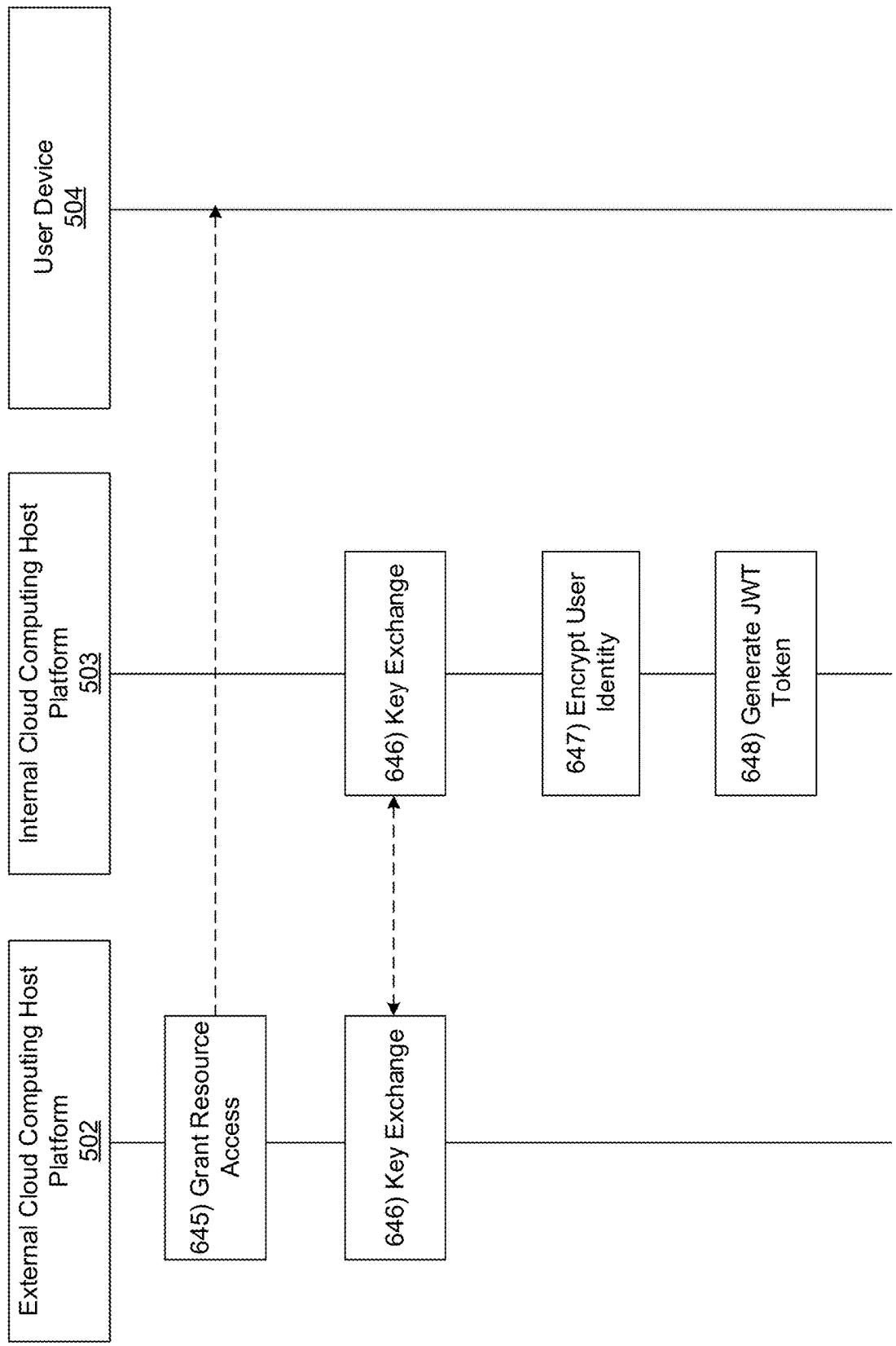
Figure 6M:
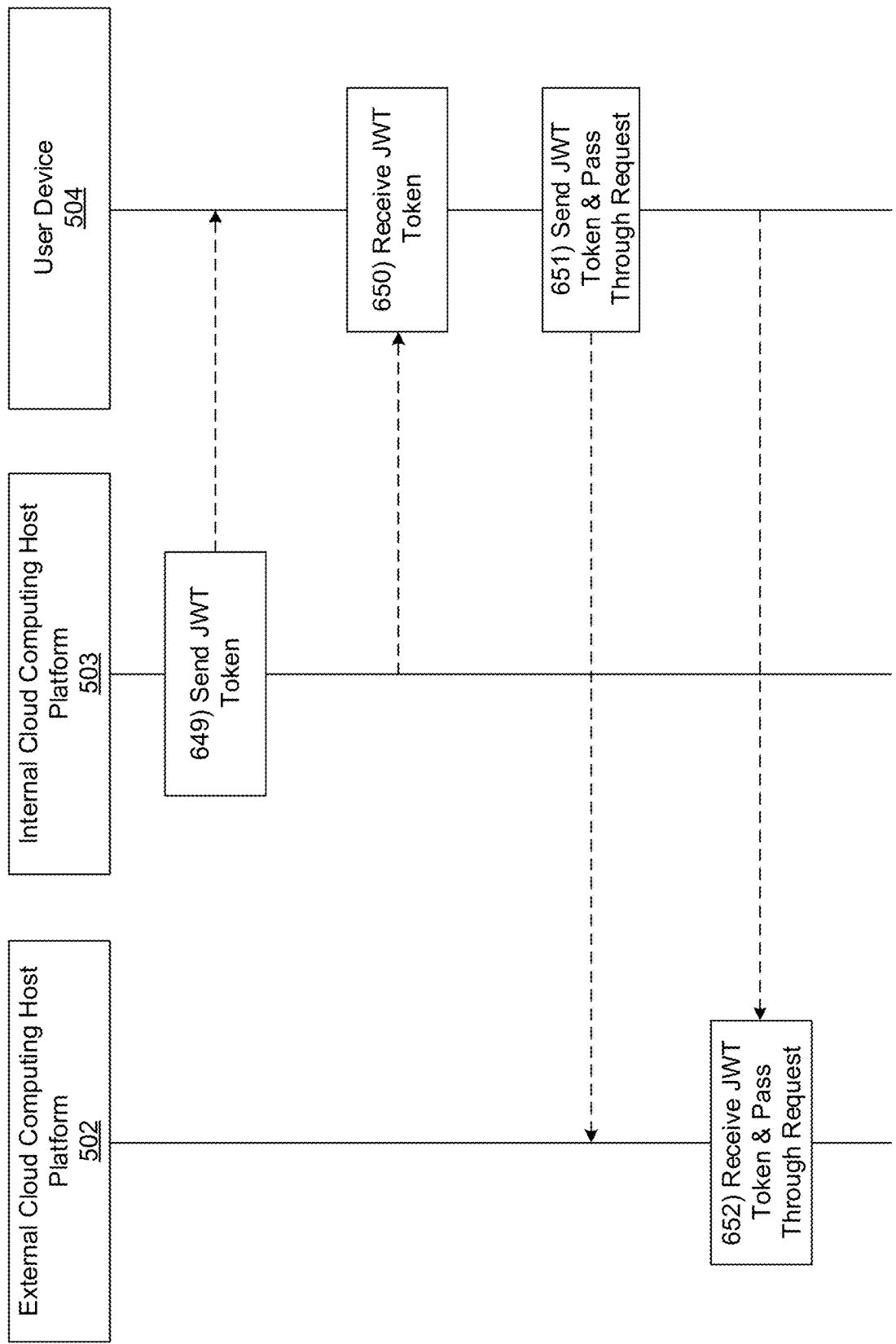
Figure 6O:
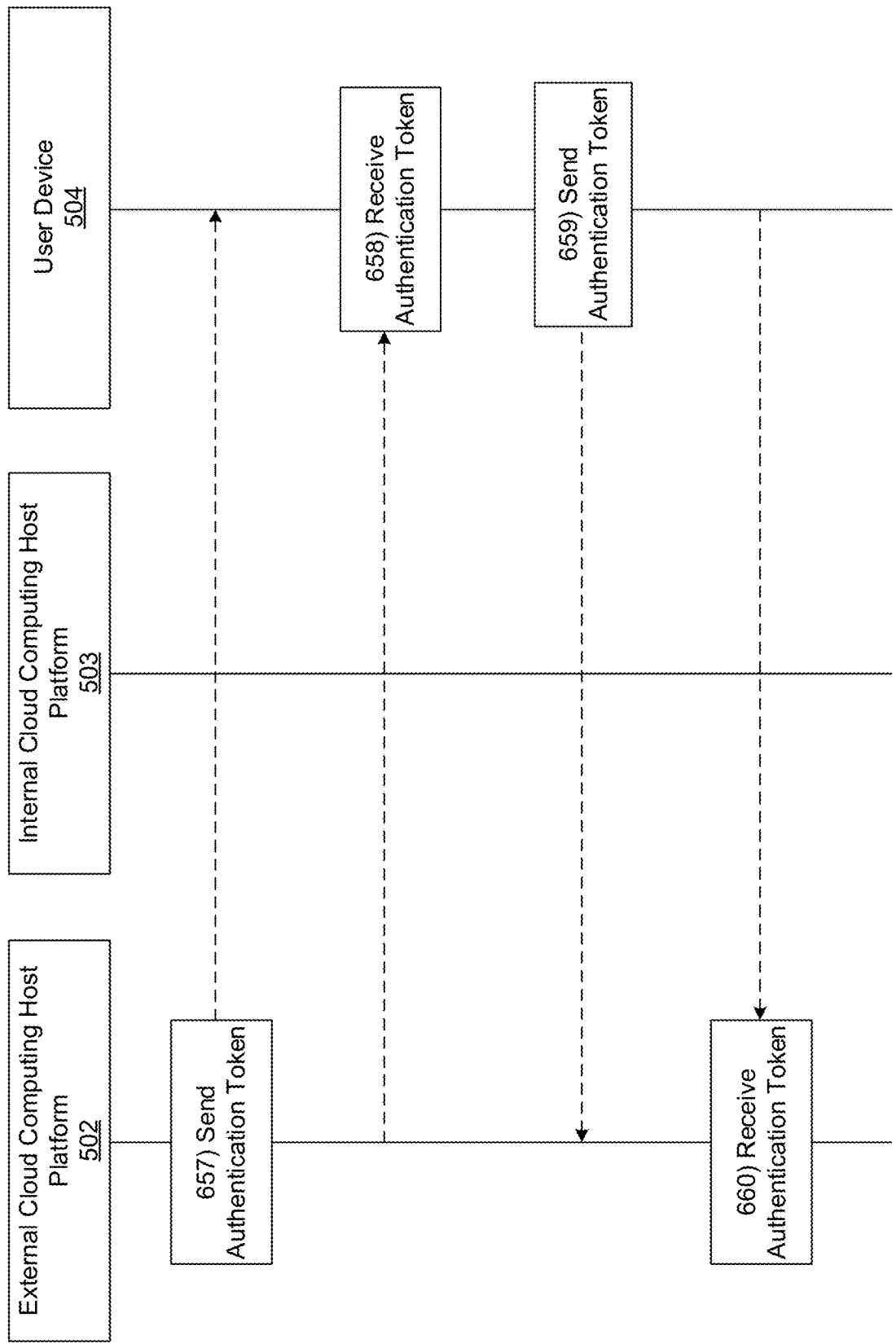
Figure 6P:
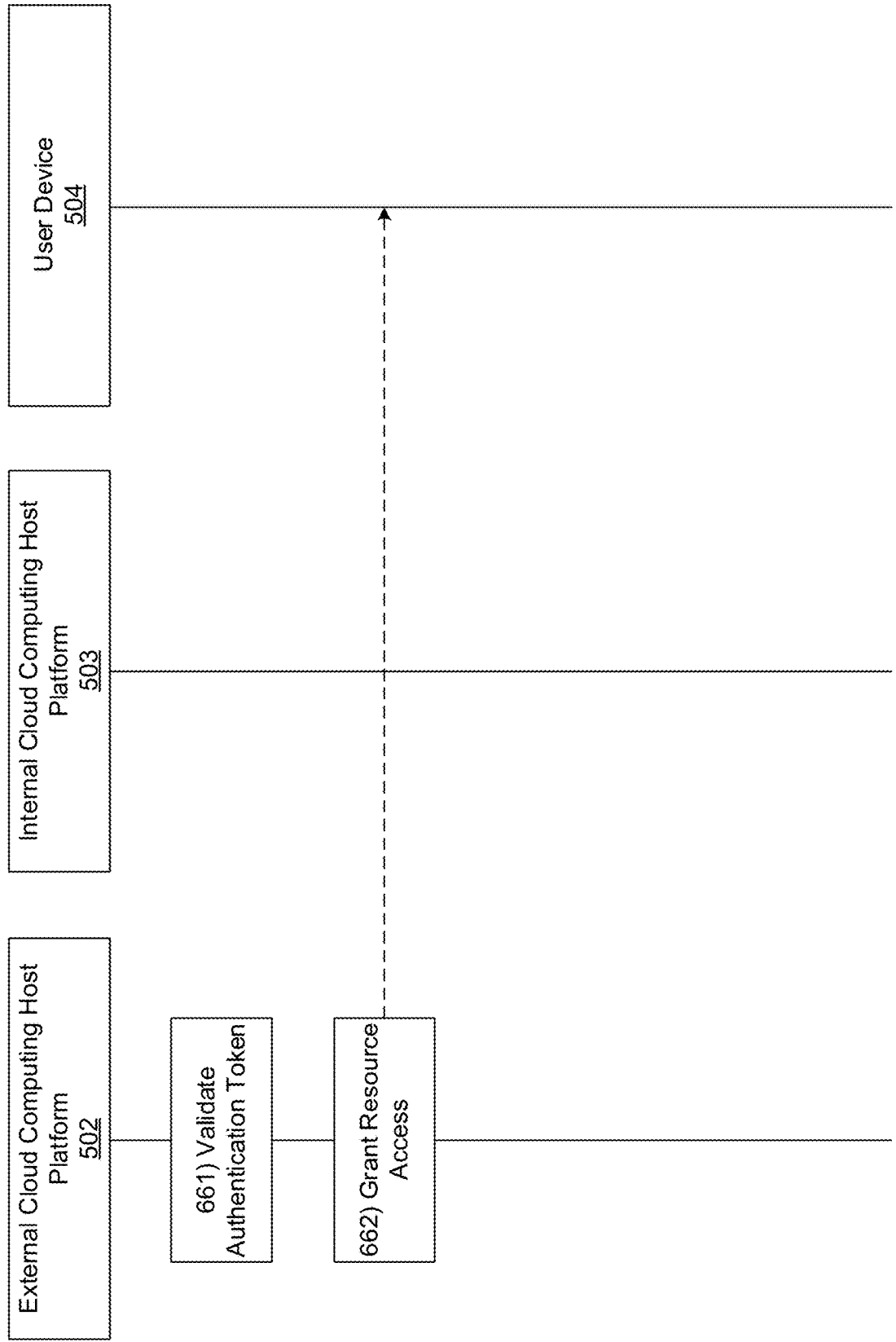

FIGS. 6A-6P depict subsets of the illustrative event sequence, depicted by FIG. 6, for deploying a system for domain pass-through authentication in a hybrid cloud environment that utilizes improved domain pass-through techniques in accordance with one or more example embodiments. Referring to FIG. 6A, at step 601, the internal cloud computing host platform 503 may establish a connection with the external cloud computing host platform 502. For example, the internal cloud computing host platform 503 may establish a first network connection with the external cloud computing host platform 502 to link the internal cloud computing host platform 503 to the external cloud computing host platform 502.

At step 602, the internal cloud computing host platform 503 may send resource location (RL) connector information to the external cloud computing host platform 502. For example, the internal cloud computing host platform 503 may send, to the external cloud computing host platform 502 and while the first network connection is established, the RL connector information. In some examples, in sending the RL connector information to the external cloud computing host platform 502, the internal cloud computing host platform 503 may send an internet protocol (IP) address and/or a hostname corresponding to one or more RL connectors on the internal cloud computing host platform 503. For example, the one or more RL connectors may be similar to cloud connector 509.

At step 603, the external cloud computing host platform 502 may receive the RL connector information sent at step 602. For example, the external cloud computing host platform 502 may receive, from the internal cloud computing host platform 503 and while the first network connection is established, the RL connector information. In some examples, the external cloud computing host platform 502 may receive the RL connector information at a cloud configuration service on the external cloud computing host platform, such as cloud configuration service 505.

At step 604, the external cloud computing host platform 502 may register the RL connectors corresponding to the RL connector information received at step 603. For example, the external cloud computing host platform 502 may store, using the cloud configuration service 505, the RL connector information. In some examples, the external cloud computing host platform 502 may secure the RL connector information using a transport layer security (TLS) protocol. In other examples, the external cloud computing host platform 502 may determine a plurality of RL connectors that the user device 504 previously accessed based on information stored at the cloud configuration service 505. In these examples, resource location service 509a and authentication agent 509b may both be hosted on the cloud connector 509, and the external cloud computing host platform 502 may determine that the RL connectors should not be registered.

Referring to FIG. 6B, at step 605, the user device 504 may establish a connection with the external cloud computing host platform 502. For example, the user device 504 may establish a second network connection to link the user device 504 to the external cloud computing host platform 502.

At step 606, the user device 504 may send an account record request to the external cloud computing host platform 502. For example, the user device 504 may send, while the first network connection is established and to the external cloud computing host platform 502, the account record request. In some examples, the user device 504 may initiate sending the account record request using a virtual machine receiver program or application. The account record request may be sent in response to user input received via a user interface of the user device 504. In some examples, the user device 504 may send the account record request in response to a network change. In these examples, the user device 504 may determine the network change using a network information application programming interface (API). In other examples, the user device 504 may send the account record request in response to determining that a predetermined time period since a previous account record request has expired. In sending the account record request, the user device 504 may request metadata corresponding to an enterprise application store hosted by the external cloud computing host platform 502.

At step 607, the external cloud computing host platform 502 may receive the account record request. For example, the external cloud computing host platform 502 may receive, from the user device 504 and while the second network connection is established, the account record request. In some examples, the external cloud computing host platform 502 may receive the account record request at an enterprise application store 507.

At step 608, the external cloud computing host platform 502 may determine one or more resource locator service (RLS) endpoints each corresponding to an RL connector. For example, after receiving the account record request directed to the enterprise application store 507, the external cloud computing host platform may determine, using the cloud configuration service 505, the RL connector information stored by the cloud configuration service at step 604.

Referring to FIG. 6C, at step 609, the external cloud computing host platform 502 may send the account records, requested at step 607, to the user device 504. For example, the external cloud computing host platform 502 may send the account records, while the second network connection is established, to the user device 504. In some examples, the external cloud computing host platform 502 may send the account records along with the RLS endpoints determined at step 608.

At step 610, the user device 504 may receive, using a virtual machine receiver program or application, the account records and the RLS endpoints sent at step 609. In some examples, the RLS endpoints may be received by code running on the virtual machine receiver program or application in response to a get configuration call. In this example, the virtual machine receiver program or application may be a web service, and the resource location service 509a and the authentication agent 509b may be configured to allow cross origin resource sharing (CORS) to allow the user device 504 to access RLS and the authentication agent 509b from web pages downloaded from enterprise application store 507. In other examples, the virtual machine receiver program or application may be a native service.

At step 611, the user device 504 may establish a connection with the internal cloud computing host platform 503. For example, the user device 504 may establish a third network connection with the internal cloud computing host platform 503 to link the user device 504 to the internal cloud computing host platform 503.

At step 612, the user device 504 may send a resource location (RL) identity request to the internal cloud computing host platform. For example, the user device 504 may send, to the internal cloud computing host platform 503 and while the third network connection is established, the RL identity request. In some examples, in sending the RL identity request, the user device 504 may send a multicast transmission to the one or more RL connectors corresponding to the internal cloud computing host platform 503. In other examples, in sending the RL identity request, the user device 504 may send an asynchronous transmission to each of the one or more RL connectors corresponding to the internal cloud computing host platform 503. These one or more RL connectors may be the one or more RL connectors registered by the external cloud computing host platform 502 at step 604.

Referring to FIG. 6D, at step 613, the internal cloud computing host platform 503 may receive, from the user device 504, the RL identity request send at step 612. For example, the internal cloud computing host platform 503 may receive, while the third network connection is established and at each of the one or more RL connectors, an RL identity request.

At step 614, the internal cloud computing host platform 503 may send one or more reachable resource location indications to the user device 504. The internal cloud computing host platform 503 may send, while the third network connection is established, the one or more reachable resource location indications. For example, each of a subset of the one or more RL connectors corresponding to the internal cloud computing host platform 503 may send a reachable resource location indication. In some examples, all of the one or more RL connectors may send a reachable resource location indication. In other examples, none of the one or more RL connectors may send a reachable resource location indication. In yet additional examples, a subset of the one or more RL connectors may each send a reachable resource location indication.

At step 615, the user device 504 may receive the one or more reachable resource location indications from the internal cloud computing host platform 503. For example, the user device 504 may receive the one or more reachable resource location indications while the third network connection is established.

At step 616, the user device 504 may update, based on the one or more reachable resource location indications received at step 615, a stored list of accessible RL connectors. For example, if the user device 504 received a reachable resource location indication from each of a first and second RL connector at the internal cloud computing host platform 503, the user device 504 may update the stored list of accessible RL connectors to include the first and second RL connectors. In some examples, the stored list of accessible RL connectors may include resource location identifiers and their corresponding reachable resource locations (such as a fully qualified domain name corresponding to the resource location identifier). In some examples, the user device 504 may update the reachable resource location list based on a detected change in URLs corresponding to the resource location service 509a. In other examples, the user device 504 may detect a network connection change, and may update the reachable resource location list based on the network connection change.

Referring to FIG. 6E, at step 617, the user device 504 may send a resource access request to the external cloud computing host platform 502. For example, the user device 504 may send, while the second network connection is established and to the external cloud computing host platform 502. For example, the user device 504 may send, using the virtual machine receiver program or application, the resource access request.

At step 618, the external cloud computing host platform 502 may receive, from the user device 504, the resource access request sent at step 617. For example, the external cloud computing host platform 502 may receive, while the second network connection is established, the resource access request. In some examples, the external cloud computing host platform may receive, using enterprise application store 507, the resource access request.

At step 619, the external cloud computing host platform 502 may send, in response to the resource access request received at step 618, an authentication challenge. For example, the external cloud computing host platform 502 may send, while the second network connection is established, the authentication challenge. In some examples, the external cloud computing host platform 502 may send the authentication challenge using the enterprise application store 507. In sending the authentication challenge, the external cloud computing host platform 502 may send a location corresponding to an authentication service hosted by the external cloud computing host platform 502, such as authentication service 506.

At step 620, the user device 504 may receive the authentication challenge sent at step 619. For example, the user device 504 may receive the authentication challenge while the second network connection is established and using the virtual machine receiver program or application.

Referring to FIG. 6F, at step 621, the user device may send an authentication method request. For example, the user device 504 may send the authentication method request while the second network connection is established and using the virtual machine receiver program or application.

At step 622, the external cloud computing host platform 502 may receive the authentication method request sent at step 621. For example, the external cloud computing host platform 502 may receive, while the second network connection is established and using an authentication service maintained at the external cloud computing host platform 502, such as authentication service 506, the authentication method request.

At step 623, in response to the authentication method request received at step 622, the external cloud computing host platform 502 may send a method indication indicating a type of authentication method to be used and an indication of authentication agents corresponding to the internal cloud computing host platform 503. In this example, each authentication agent may correspond to an RL cloud connector hosted by the internal cloud computing host platform 503. In some examples, the method indication may indicate that a particular authentication method is available to the user device 504, such as pass-through authentication with a ticketing service or pass-through authentication with encryption and signature. The method indication may include an indication that a first, second, third, and fourth authentication agent are each hosted by the internal cloud computing host platform 503. In some examples, one or more of the authentication agents may be secured by the internal cloud computing host platform using a TLS protocol. The one or more authentication agents may also share a base uniform resource locator (URL) with a resource location service, such as resource location service 509a.

At step 624, the user device 504 may receive the method indication sent at step 623. For example, the user device 504 may receive, while the second network connection is established and using the virtual machine receiver program or application, the method indication.

Referring to FIG. 6G, at step 625, the user device 504 may determine an authentication agent to use to facilitate the authentication method indicated in the method indication. For example, the user device 504 may compare the authentication agents received at step 623 with the list of reachable resource locations. In this example, the user device 504 may determine an authentication agent that corresponds to an RL connector that is reachable by the user device 504. For example, the user device 504 may determine that a first RL connector is reachable, and may select the authentication agent that corresponds to the first RL connector. In some examples, the user device 504 may determine that it has not recorded any reachable resource locations. In these examples, the user device 504 may not perform pass-through authentication and the method may end.

At step 626, the user device 504 may send a domain pass-through request to the internal cloud computing host platform 503. For example, the user device 504 may send the domain pass-through request while the third network connection is established. In some examples, in sending the domain pass-through request, the user device 504 may send a request to perform Integrated Windows Authentication (IWA).

At step 627, the internal cloud computing host platform 503 may receive the domain pass-through request sent at step 626. For example, the internal cloud computing host platform may receive, while the third network connection is established and at an authentication agent hosted by the internal cloud computing host platform 503, the domain pass-through request. In some examples, the authentication agent may be the authentication agent determined at step 625. In some examples, the authentication agent may be included in the reachable resource location list. In these examples, the reachable resource location list may contain one or more authentication agents. The internal cloud computing host platform 503 may receive the domain pass-through request at an authentication agent corresponding to the lowest latency level. In some examples, the user device

504 may determine a latency level corresponding to the one or more authentication agents listed in the reachable resource location list, and may direct the domain pass-through request to the authentication agent with the lowest latency level.

At step 628, the internal cloud computing host platform 503 may determine user identity information. For example, each authentication agent maintained at the internal cloud computing host platform 503 may have access to an active directory that stores a plurality of user identity claims. In some examples, the active directory may be hosted by the internal cloud computing host platform 503. The internal cloud computing host platform 503 may initiate communication between the authentication agent and the active directory to determine the user identity claims. For example, the internal cloud computing host platform 503 may initiate an IWA token transfer from the authentication agent to the active directory. In this example, the active directory may return the user identity claims.

Referring to FIG. 6H, at step 629, the internal cloud computing host platform 503 may determine an available pass-through method to pursue. For example, the internal cloud computing host platform 503 may pursue one of the methods received at step 624. If the internal cloud computing host platform 503 determines that pass-through authentication with a ticketing service should be used, the internal cloud computing host platform 503 may proceed to step 630. If the internal cloud computing host platform 503 determines that pass-through authentication with encryption and signature should be used, the internal cloud computing host platform 503 may proceed to step 646.

At step 630, the internal cloud computing host platform 503 may send the user identity information determined at step 628 to external cloud computing host platform 502. In some examples, the internal cloud computing host platform 503 may send, while the first network connection is established and to the external cloud computing host platform 502, the user identity information. In some examples, the user identity information may be a tenant identification. In some examples, the internal cloud computing host platform 503 may generate a single tenant key based on the tenant identification and the user identity claims. In these examples, the internal cloud computing host platform 503 may send, to the external cloud computing host platform 502, the single tenant key. In some examples, the internal cloud computing host platform 503 may send the user identity information using the authentication agent.

At step 631, the external cloud computing host platform 502 may receive the user identity information sent at step 630. For example, the external cloud computing host platform 502 may receive, while the first network connection is established, the single tenant key including the user identity claims and the tenant identification. In some examples, the external cloud computing host platform 502 may receive the user identity information using a ticketing service maintained by the external cloud computing host platform 502, such as ticketing service 510.

At step 632, the external cloud computing host platform 502 may store the user identity information received at step 632. For example, the external cloud computing host platform 502 may store a tenant identity using ticketing service 510. In this example, the external cloud computing host platform 502 may store the user identity claims and the tenant identification.

Referring to FIG. 6I, at step 633, the external cloud computing host platform 502 may validate the single tenant key using ticketing service 510. At step 634, the external cloud computing host platform 502 may generate, in response to validating the single tenant key at step 633, a one-time ticket. The external cloud computing host platform 502 may generate the one-time ticket using, for example, the ticketing service 510.

At step 635, the external cloud computing host platform 502 may send the one-time ticket, generated at step 634, to the user device 504. For example, the external cloud computing host platform 502 may send the one-time ticket while the second network connection is established and using the ticketing service 510. In some examples, in sending the one-time ticket to the user device 504, the external cloud computing host platform 502 may send the one-time ticket to an authentication agent of the internal cloud computing host platform 503, such as authentication agent 509b, and then subsequently from the authentication agent 509b to the user device 504.

At step 636, the user device 504 may receive the one-time ticket from the external cloud computing host platform 502. In some examples, the user device 504 may receive the one-time ticket from the external cloud computing host platform 502 through the internal cloud computing host platform 503. The user device 504 may receive the one-time ticket while the second network connection is established.

Referring to FIG. 6J, at step 637, the user device 504 may send a pass-through authentication request along with the one-time ticket received at step 636. For example, the user device 504 may send, while the second network connection is established, the pass-through authentication request along with the one-time ticket.

At step 638, the external cloud computing host platform 502 may receive the pass-through authentication request and the one-time ticket send at step 637. For example, the external cloud computing host platform 502 may receive the pass-through authentication request along with the one-time ticket while the second network connection is established and using the authentication service 506.

At step 639, the external cloud computing host platform 502 may determine a user identity. For example, the external cloud computing host platform 502 may initiate communication between authentication service 506 and ticketing service 510. In some examples, this communication may include a transfer of the one-time ticket from the authentication service 506 to the ticketing service 510. In response to receiving the one-time ticket from the authentication service 506, the ticketing service 510 may retrieve the tenant identification and user identity claims, stored by the ticketing service 510 at step 632. After retrieving the tenant identification and user identity claims, the ticketing service 510 may send the tenant identification and user identity claims to the authentication service 506.

At step 640, after determining the tenant identification and user identity claims, the external cloud computing host platform 502 may generate, using the authentication service 506, an authentication token.

Referring to FIG. 6K, at step 641, the external cloud computing host platform 502 may send the authentication token, generated at step 640, to the user device 504. For example, the external cloud computing host platform 502 may send the authentication token while the second network connection is established. In some examples, the external cloud computing host platform 502 may send the authentication token using the authentication service 506.

At step 642, the user device 504 may receive the authentication token. For example, the user device 504 may receive the authentication token while the second network connection is established and from the authentication service 506 of the external cloud computing host platform 502.

At step 643, the user device 504 may send the authentication token, received at step 642, to the enterprise application store 507 of the external cloud computing host platform 502. For example, the user device 504 may send the authentication token while the second network connection is established.

At step 644, the external cloud computing host platform 502 may receive the authentication token using the enterprise application store 507. For example, the external cloud computing host platform 502 may receive the authentication token from the user device 504 and while the second network connection is established.

At step 645, the external cloud computing host platform 502 may grant the user device 504 access to the secure resources of the enterprise application store 507. For example, the virtual machine receiver program or application may establish a secure session with the enterprise application store 507. If the external cloud computing host platform 502 successfully grants the user device 504 access to the secure resources of the enterprise application store 507, the method may end. In some examples, if the external cloud computing host platform 502 does not successfully grant the user device 504 access to the secure resources of the enterprise application store 507, the external cloud computing host platform 502 may proceed to step 646. In other examples, rather than performing steps 630-645, the external cloud computing host platform 502 may proceed to step 646 from step 629 to perform pass-through authentication with encryption and signature. For example, pass-through authentication using a ticketing service may be performed in addition or as an alternative to pass-through authentication with encryption and signature.

At step 646, the external cloud computing host platform 502 may perform a public-private key exchange with the internal cloud computing host platform 503. In some examples, the external cloud computing host platform 502 and the internal cloud computing host platform 503 may perform a Diffie Hellman key exchange. In some examples, the external cloud computing host platform 502 may exchange keys with the internal cloud computing host platform 503 using the first network connection. The public-private key exchange may be a key exchange between the authentication service 506 of the external cloud computing host platform 502 and the authentication agent 509*b* of the internal cloud computing host platform 503.

At step 647, the internal cloud computing host platform 503 may encrypt the user identity claims and the tenant identification using a public key of the authentication service 506. For example, the internal cloud computing host platform 503 may have previously received the public key of the authentication service 506 at step 646. In some examples, the internal cloud computing host platform 503 may use the authentication agent 509*b* to encrypt the tenant identification and the user identity claims.

At step 648, the internal cloud computing host platform 503 may generate a one-time use token, such as a JSON Web Token (JWT). In generating the JWT token the internal cloud computing host platform 503 may generate a token that includes the tenant identification and user identity claims encrypted at step 647. Once the token is generated, the internal cloud computing host platform 503 may sign the token using a private key corresponding to the internal cloud computing host platform 503. In some examples, the internal cloud computing host platform 503 may use the authentication agent 509*b* to generate and sign the token.

Referring to FIG. 6M, at step 649, the internal cloud computing host platform 503 may send the token, generated at step 648, to the user device 504. For example, the internal cloud computing host platform 503 may send the token while the third network connection is established. In some examples, the internal cloud computing host platform 503 may send the token using the authentication agent 509*b*.

At step 650, the user device 504 may receive the token sent at step 649. For example, the user device 504 may receive the token while the third network connection is established.

At step 651, the user device 504 may send the token, along with a pass-through authentication request, to the external cloud computing host platform 502. For example, the user device 504 may send, while the second network connection is established, the token. In sending the pass-through authentication request, the user device 504 may send a request to perform pass-through authentication with encryption and signature. In some examples, the user device 504 may initiate sending the token and the pass-through request using the virtual machine receiver program or application running on the user device 504.

At step 652, the external cloud computing host platform 502 may receive the token and the pass-through authentication request sent at step 651. In some examples, the external cloud computing host platform 502 may receive the token and the pass-through authentication request while the second network connection is established. In some examples, the external cloud computing host platform 502 may receive the token and pass-through request at the enterprise application store 507.

Referring to FIG. 6N, at step 653, the external cloud computing host platform 502 may validate the signature used to sign the token at step 648. For example, the external cloud computing host platform 502 may use the authentication service 506 to validate the signature. In some examples, the authentication service 506 may have previously received a public key corresponding to the authentication agent 509*b* during the key exchange performed at step 646. In these examples, the authentication service 506 may use the public key corresponding to the authentication agent 509*b* to validate the signature.

At step 654, the external cloud computing host platform 502 may decrypt the token received at step 652 to determine the tenant identification and the user identity claims. In some examples, the external cloud computing host platform may use a private key of the authentication service 506 to decrypt the token.

At step 655, the external cloud computing host platform 502 may validate the tenant identification and the user identity claims. For example, the external cloud computing host platform 502 may use the authentication service 506 to validate the tenant identification. At step 656, the external cloud computing host platform 502 may generate an authentication token using the authentication service 506.

At step 657, the external cloud computing host platform 502 may send the authentication token, generated at step 656, to the user device 504. For example, the external cloud computing host platform 502 may send, while the second network connection is established and to the user device 504, the authentication token. In some examples, the external cloud computing host platform 502 may use the authentication service 506 to initiate sending the authentication token.

At step 658, the user device 504 may receive the authentication token from the external cloud computing host platform 502. For example, the user device 504 may receive the authentication token while the second network connection is established.

At step 659, the user device 504 may send the authentication token to the external cloud computing host platform 502. For example, the user device 504 may send the authentication token to the external cloud computing host platform 502 while the second network connection is established. In some examples, the user device 504 may send the authentication token in response to a request by the virtual machine receiver program or application to access secure resources from the external cloud computing host platform 502. In these examples, the user device 504 may send the authentication token along with a request to access the secure resources.

At step 660, the external cloud computing host platform 502 may receive the authentication token send at step 659. For example, the external cloud computing host platform 502 may receive the authentication token while the second network connection is established. In some the external cloud computing host platform 502 may receive the authentication token using the enterprise application store 507.

Referring to FIG. 6P, at step 661, the external cloud computing host platform 502 may validate the authentication token received at step 660. At step 662, the external cloud computing host platform 502 may grant the user device 504 access to the secure resources of the enterprise application store 507. For example, the virtual machine receiver program or application may establish a secure session with the enterprise application store 507.

Subsequently, the example event sequence may end, and external cloud computing host platform 502 and internal cloud computing host platform 503 may continue to facilitate pass-through authentication in a similar manner as discussed above (using a ticketing service to generate a one-time ticket, encrypting user identity in a secure token, and the like). By operating in this way, external cloud computing host platform 502 and internal cloud computing host platform 503 may improve the external cloud computing host platform's ability to establish connections between an enterprise application store, stored at the external cloud computing host platform 502, and one or more user devices included in computing environment 100.

Figure 7:
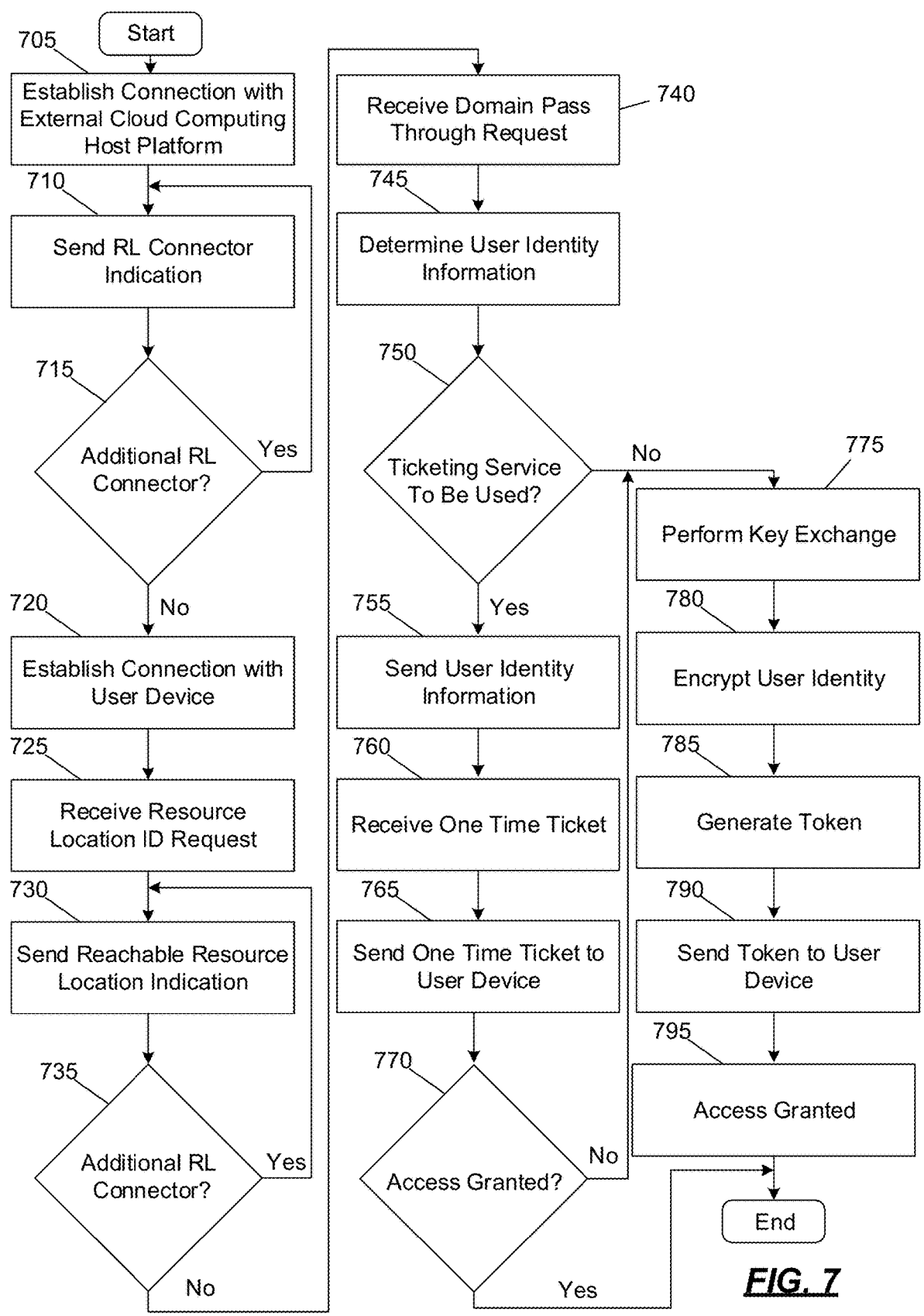
FIG. 7 depicts an illustrative method for deploying an external cloud computing host platform and an internal cloud computing host platform that utilize improved pass-through authentication techniques in accordance with one or more illustrative aspects described herein.

FIG. 7 depicts an illustrative method for deploying an internal cloud computing host platform that use improved techniques to perform pass-through authentication with a user device in accordance with one or more example embodiments. Referring to FIG. 7, at step 705, a computing platform having at least one processor, a communication interface, and memory may establish a connection with an external cloud computing host platform. At step 710, the computing platform may send an indication of an RL connector to the external cloud computing host platform. In some examples, the RL connector may correspond to a cloud connector installed at the computing platform. In sending the indication of the RL connector to the external cloud computing host platform, the computing platform may cause the cloud connector to register with a cloud configuration service hosted by the external cloud computing host platform. In causing the cloud connector to register with the cloud configuration service, the computing platform may cause metadata, such as a resource location corresponding to the cloud connector, to be recorded at the cloud configuration service. At step 715, the computing platform may determine whether an indication of an additional RL connector should be sent. If the computing platform determines that an indication of an additional RL connector should be sent, the computing platform may return to step 710. In some examples, a user device may receive user input via a user interface corresponding to the user device. In these examples, steps 705-715 may occur after the user input is received. If the computing platform determines that an indication of an additional RL connector should not be sent, the computing platform may proceed to step 720.

At step 720, the computing platform may establish a connection with a user device. At step 725, the computing platform may receive a resource location identification request from the user device. In some examples, the computing platform may establish the connection with the user device in response to user input received via the user interface corresponding to the user device. At step 730, the computing platform may send a reachable resource location indication to the user device. At step 735, the computing platform may determine whether an indication of an additional RL connector should be sent. If the computing platform determines that an indication of an additional RL connector should be sent, the computing platform may return to step 730. In some examples, indications of multiple RL connectors may be sent simultaneously. If the computing platform determines that an indication of an additional RL connector should not be sent, the computing platform may proceed to step 740.

At step 740, the computing platform may receive a domain pass-through request from the user device. At step 745, the computing platform may determine user identity information. At step 750, the computing platform may determine whether a ticketing service should be used to perform pass-through authentication. If the computing platform determines that a ticketing service should not be used to perform pass-through authentication, the computing platform may proceed to step 775. If the computing platform determines that a ticketing service should be used to perform pass-through authentication, the computing platform may proceed to step 755.

At step 755, the computing platform may send the user identity information to the external cloud computing host platform. At step 760, the computing platform may receive a one-time ticket from the external cloud computing host platform. At step 765, the computing platform may send the one-time ticket to the user device. In some examples, the user device may send the one-time ticket to an authentication service at the external cloud computing host platform, which may exchange the one-time ticket for a user identity of the user device, and may provide the user device with an authentication token. At step 770, the computing platform may determine whether the user device has been granted access to an enterprise application store hosted by the external cloud computing host platform. If the computing platform determines that access has been granted, the method may end. In some examples, if the computing platform determines that access has not been granted, the computing platform may proceed to step 775. In other examples, if the computing platform determines that access has not been granted, the method may end.

At step 775, the computing platform may perform a key exchange with the external cloud computing host platform. At step 780, the computing platform may encrypt the user identity. At step 785, the computing platform may generate a token containing the encrypted user identity. At step 790, the computing platform may send the token to the user device. The user device may send this token, along with a domain pass-through authentication request to the authentication service at the external cloud computing host platform, which may validate the user identity corresponding to the user device, generate an authentication token, and send the authentication token to the user device. The user device may subsequently send an access request along with the authentication token to an enterprise application store hosted by the external cloud computing host platform. At step 795, the user device may be granted access to the enterprise application store on the external cloud computing host platform.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   establish, with an external cloud computing platform, a first network connection;
   send, to the external cloud computing platform and while the first network connection is established, a registration request corresponding to each of a plurality of resource location connectors wherein the registration request corresponding to each of the plurality of resource location connectors causes a resource location service (RLS) endpoint corresponding to each of the plurality of resource location connectors to be stored at a cloud configuration service at the external cloud computing host platform;
   establish, with a user device, a second network connection;
   receive, for each of the plurality of resource location connectors, a request for a resource location identifier corresponding to each of the plurality of resource location connectors;
   determine an accessible resource location connector, where the accessible resource location connector comprises one of the plurality of resource location connectors that is accessible;
   send, to the user device and while the second network connection is established, a resource location identifier corresponding to the accessible resource location connector;
   receive, from the user device, a domain pass-through authentication request;
   determine, using an authentication agent corresponding to the accessible resource location connector, a user identity;
   send, to a ticketing service stored on the external cloud computing platform, the user identity;
   receive, from the ticketing service stored on the external cloud computing platform, a one-time domain pass-through authentication ticket; and
   send, to the user device, the one-time domain pass-through authentication ticket, wherein sending the one-time domain pass-through authentication ticket to the user device allows the user device to perform domain pass-through authentication with the external cloud computing platform and to access protected resources on the external cloud computing platform.

2. The computing platform of claim 1, wherein the memory stores additional computer-readable instructions that, when executed by the at least one processor, further cause the computing platform to:
perform, between the authentication agent and an authentication service stored at the external cloud computing host platform, a public-private key exchange;
encrypt, using a public key from the authentication service, the user identity;
generate a secure token including the encrypted user identity, wherein generating the secure token comprises signing the secure token with a private key corresponding to the authentication agent; and
send, to the user device and while the second network connection is established, the secure token, wherein sending the secure token to the user device allows the user device to perform domain pass-through authentication with the external cloud computing platform and to access protected resources on the external cloud computing platform.

3. The computing platform of claim 2, wherein the memory stores additional computer-readable instructions that, when executed by the at least one processor, further cause the computing platform to:
determine, after sending the one-time domain pass-through authentication ticket, that the domain pass-through authentication between the user device and the external cloud computing host platform was unsuccessful.

4. The computing platform of claim 3, wherein performing the public-private key exchange comprises performing the public-private key exchange in response to determining that the domain pass-through authentication between the user device and the external cloud computing host platform was unsuccessful.

5. The computing platform of claim 1, wherein the computing platform comprises an internal cloud computing host platform that includes an active directory and one or more cloud connectors, wherein the one or more cloud connectors each include a resource location service and an authentication agent, and wherein the authentication agent is connected to the active directory.

6. The computing platform of claim 1, wherein the memory stores additional computer-readable instructions that, when executed by the at least one processor, further cause the computing platform to:
determine a second accessible resource location connector, where the second accessible resource location connector comprises one of the plurality of resource location connectors that is accessible;
send, to the user device and while the second network connection is established, a second resource location identifier corresponding to the second accessible resource location connector; and
determine that a latency level corresponding to the second accessible resource location connector is higher than a latency level corresponding to the accessible resource location connector.

7. The computing platform of claim 6, wherein receiving the domain pass-through authentication request comprises receiving, based on the determination that the latency level corresponding to the second accessible resource location connector is higher than the latency level corresponding to the accessible resource location connector, the domain pass-through authentication request by the authentication agent corresponding to the accessible resource location connector.

8. A method comprising:
at a computing platform comprising at least one processor, a communication interface, and memory:
establishing, with an external cloud computing platform, a first network connection;
sending, to the external cloud computing platform and while the first network connection is established, a registration request corresponding to each of a plurality of resource location connectors wherein the registration request corresponding to each of the plurality of resource location connectors causes a resource location service (RLS) endpoint corresponding to each of the plurality of resource location connectors to be stored at a cloud configuration service at the external cloud computing host platform;
establishing, with a user device, a second network connection;
receiving, for each of the plurality of resource location connectors, a request for a resource location identifier corresponding to each of the plurality of resource location connectors;
determining an accessible resource location connector, where the accessible resource location connector comprises one of the plurality of resource location connectors that is accessible;
sending, to the user device and while the second network connection is established, a resource location identifier corresponding to the accessible resource location connector;
receiving, from the user device, a domain pass-through authentication request;
determining, using an authentication agent corresponding to the accessible resource location connector, a user identity;
sending, to a ticketing service stored on the external cloud computing platform, the user identity;
receiving, from the ticketing service stored on the external cloud computing platform, a one-time domain pass-through authentication ticket; and
sending, to the user device, the one-time domain pass-through authentication ticket, wherein sending the one-time domain pass-through authentication ticket to the user device allows the user device to perform domain pass-through authentication with the external cloud computing platform and to access protected resources on the external cloud computing platform.

9. The method of claim 8, further comprising:
performing, between the authentication agent and an authentication service stored at the external cloud computing host platform, a public-private key exchange;
encrypting, using a public key from the authentication service, the user identity;
generating a secure token including the encrypted user identity, wherein generating the secure token comprises signing the secure token with a private key corresponding to the authentication agent; and
sending, to the user device and while the second network connection is established, the secure token, wherein sending the secure token to the user device allows the user device to perform domain pass-through authentication with the external cloud computing platform and to access protected resources on the external cloud computing platform.

10. The method of claim 9, further comprising:
determining, after sending the one-time domain pass-through authentication ticket, that the domain pass-through authentication between the user device and the external cloud computing host platform was unsuccessful.

11. The method of claim 10, wherein performing the public-private key exchange comprises performing the public-private key exchange in response to determining that the domain pass-through authentication between the user device and the external cloud computing host platform was unsuccessful.

12. The method of claim 8, wherein the computing platform comprises an internal cloud computing host platform that includes an active directory and one or more cloud connectors, wherein the one or more cloud connectors each include a resource location service and an authentication agent, and wherein the authentication agent is connected to the active directory.

13. The method of claim 8, further comprising:
determining a second accessible resource location connector, where the second accessible resource location connector comprises one of the plurality of resource location connectors that is accessible;
sending, to the user device and while the second network connection is established, a second resource location identifier corresponding to the second accessible resource location connector; and
determining that a latency level corresponding to the second accessible resource location connector is higher than a latency level corresponding to the accessible resource location connector.

14. The method of claim 13, wherein receiving the domain pass-through authentication request comprises receiving, based on the determination that the latency level corresponding to the second accessible resource location connector is higher than the latency level corresponding to the accessible resource location connector, the domain pass-through authentication request by the authentication agent corresponding to the accessible resource location connector.

15. One or more non-transitory computer-readable media storing instructions that, when executed by a computing platform comprising at least one processor, a communication interface, and memory, cause the computing platform to:
establish, with an external cloud computing platform, a first network connection;
send, to the external cloud computing platform and while the first network connection is established, a registration request corresponding to each of a plurality of resource location connectors wherein the registration request corresponding to each of the plurality of resource location connectors causes a resource location service (RLS) endpoint corresponding to each of the plurality of resource location connectors to be stored at a cloud configuration service at the external cloud computing host platform;
establish, with a user device, a second network connection;
receive, for each of the plurality of resource location connectors, a request for a resource location identifier corresponding to each of the plurality of resource location connectors;
determine an accessible resource location connector, where the accessible resource location connector comprises one of the plurality of resource location connectors that is accessible;
send, to the user device and while the second network connection is established, a resource location identifier corresponding to the accessible resource location connector;
receive, from the user device, a domain pass-through authentication request;
determine, using an authentication agent corresponding to the accessible resource location connector, a user identity;
send, to a ticketing service stored on the external cloud computing platform, the user identity;
receive, from the ticketing service stored on the external cloud computing platform, a one-time domain pass-through authentication ticket; and
send, to the user device, the one-time domain pass-through authentication ticket, wherein sending the one-time domain pass-through authentication ticket to the user device allows the user device to perform domain pass-through authentication with the external cloud computing platform and to access protected resources on the external cloud computing platform.

16. The one or more non-transitory computer-readable media of claim 15, wherein the memory stores additional instructions, that when executed by the at least one processor, cause the at least one processor to:
perform, between the authentication agent and an authentication service stored at the external cloud computing host platform, a public-private key exchange;
encrypt, using a public key from the authentication service, the user identity;
generate a secure token including the encrypted user identity, wherein generating the secure token comprises signing the secure token with a private key corresponding to the authentication agent; and
send, to the user device and while the second network connection is established, the secure token, wherein sending the secure token to the user device allows the user device to perform domain pass-through authentication with the external cloud computing platform and to access protected resources on the external cloud computing platform.

17. The one or more non-transitory computer-readable media of claim 16, wherein the memory stores additional instructions, that when executed by the at least one processor, cause the at least one processor to:
determine, after sending the one-time domain pass-through authentication ticket, that the domain pass-through authentication between the user device and the external cloud computing host platform was unsuccessful.

18. The one or more non-transitory computer-readable media of claim 17, wherein performing the public-private key exchange comprises performing the public-private key exchange in response to determining that the domain pass-through authentication between the user device and the external cloud computing host platform was unsuccessful.

19. The one or more non-transitory computer-readable media of claim 15, wherein the computing platform comprises an internal cloud computing host platform that includes an active directory and one or more cloud connectors, wherein the one or more cloud connectors each include a resource location service and an authentication agent, and wherein the authentication agent is connected to the active directory.

20. The one or more non-transitory computer-readable media of claim 15, wherein the memory stores additional computer-readable instructions that, when executed by the at least one processor, further cause the computing platform to:
  determine a second accessible resource location connector, where the second accessible resource location connector comprises one of the plurality of resource location connectors that is accessible;
  send, to the user device and while the second network connection is established, a second resource location identifier corresponding to the second accessible resource location connector; and
  determine that a latency level corresponding to the second accessible resource location connector is higher than a latency level corresponding to the accessible resource location connector.

* * * * *